(12) United States Patent
Fei et al.

(10) Patent No.: US 11,886,446 B2
(45) Date of Patent: Jan. 30, 2024

(54) CROSS-LINGUAL LANGUAGE MODELS AND PRETRAINING OF CROSS-LINGUAL LANGUAGE MODELS

(71) Applicant: Baidu USA, LLC, Sunnyvale, CA (US)

(72) Inventors: Hongliang Fei, Sunnyvale, CA (US); Puxuan Yu, Amherst, MA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 17/575,650

(22) Filed: Jan. 14, 2022

(65) Prior Publication Data

US 2022/0318255 A1 Oct. 6, 2022

Related U.S. Application Data

(60) Provisional application No. 63/171,024, filed on Apr. 5, 2021.

(51) Int. Cl.
*G06F 17/00* (2019.01)
*G06F 7/00* (2006.01)
(Continued)

(52) U.S. Cl.
CPC ...... *G06F 16/24578* (2019.01); *G06F 40/284* (2020.01); *G06F 40/58* (2020.01)

(58) Field of Classification Search
CPC ... G06F 16/24578; G06F 40/284; G06F 40/58
(Continued)

(56) References Cited

U.S. PATENT DOCUMENTS 6,381,598 B1 * 4/2002 Williamowski ........ G06F 40/55
707/999.005
2001/0029455 A1 * 10/2001 Chin ...................... G06F 40/58
704/277
(Continued)

OTHER PUBLICATIONS

Artetxe et al.,"Learning bilingual word embeddings with (almost) no bilingual data," In Proceedings of the 55th Annual Meeting of the Association for Computational Linguistics (ACL), 2017. (12pgs).
(Continued)

*Primary Examiner* — Pavan Mamillapalli
(74) *Attorney, Agent, or Firm* — NORTH WEBER & BAUGH LLP

(57) ABSTRACT

Existing research on cross-lingual retrieval cannot take good advantage of large-scale pretrained language models, such as multilingual BERT and XLM. The absence of cross-lingual passage-level relevance data for finetuning and the lack of query-document style pretraining are some of the key factors of this issue. Accordingly, embodiments of two novel retrieval-oriented pretraining tasks are presented herein to further pretrain cross-lingual language models for downstream retrieval tasks, such as cross-lingual ad-hoc retrieval (CUR) and cross-lingual question answering (CLQA). In one or more embodiments, distant supervision data was constructed from multilingual texts using section alignment to support retrieval-oriented language model pretraining. In one or more embodiments, directly finetuning language models on part of an evaluation collection was performed by making Transformers capable of accepting longer sequences. Experiments show that model embodiments significantly improve upon general multilingual language models in at least the cross-lingual retrieval setting and the cross-lingual transfer setting.

20 Claims, 20 Drawing Sheets

(51) Int. Cl.
  *G06F 16/2457* (2019.01)
  *G06F 40/58* (2020.01)
  *G06F 40/284* (2020.01)
(58) Field of Classification Search
  USPC .......................................................... 707/730
  See application file for complete search history.

(56) References Cited

U.S. PATENT DOCUMENTS

| | | | | |
|---|---|---|---|---|
| 2008/0288474 | A1* | 11/2008 | Chin ..................... | G06F 16/951 707/999.004 |
| 2010/0145673 | A1* | 6/2010 | Cancedda ........... | G06F 16/3337 704/3 |
| 2010/0274752 | A1* | 10/2010 | Moises Gonzalez ....................... | G06F 16/3344 706/50 |
| 2014/0309986 | A1* | 10/2014 | El-Sharqwi ........... | G06F 40/268 704/9 |
| 2014/0337005 | A1* | 11/2014 | Abdel-Hady ........... | G06F 16/35 704/2 |

OTHER PUBLICATIONS

Beltagy et al., "Longformer: The long-document transformer," arXiv preprint arXiv:2004.05150, 2020. (17pgs).
Bharadwaj et al.,"Language independent identification of parallel sentences using Wikipedia," In Proc. of the 20th International Conf. on World Wide Web (WWW), 2011. (2pgs).
Bonab et al.,"Training Effective Neural CLIR by Bridging the Translation Gap," In Proc. of the 43rd International ACM SIGIR conf. on research & development in Information Retrieval (SIGIR), 2020. (10 pgs).
Cao et al.,"Multilingual Alignment of Contextual Word Representations," arXiv preprint arXiv:2002.03518, 2020. (15pgs).
Chang et al.,"Pre-training Tasks for Embedding-based Large-scale Retrieval," arXiv preprint arXiv:2002.03932, 2020. (12pgs).
Chen et al., "Emoji-Powered Representation Learning for Cross-Lingual Sentiment Classification," arXiv preprint arXiv:1806.02557, 2019. (12pgs).
Conneau et al., "Unsupervised Cross-lingual Representation Learning at Scale," arXiv preprint arXiv:1911.02116, 2020. (12pgs).
Conneau et al.,"Cross-lingual Language Model Pretraining," In Advances in Neural Information Processing Systems (NeurIPS), 2019. (11pgs).
Conneau et al.,"Emerging Cross-lingual Structure in Pretrained Language Models," arXiv preprint arXiv:1911.01464, 2020. (13pgs).
Darwish et al.,"Probabilistic structured query methods," In Proceedings of the 26th Annual International ACM SIGIR Conference on Research & Development in Information Retrieval (SIGIR), 2003. (7pgs).
Gerard de Melo,"Inducing Conceptual Embedding Spaces from Wikipedia," In Proceedings of the 26th International Conference on World Wide Web (WWW), 2017. (8pgs).
Devlin et al.,"BERT:Pre-training of Deep Bidirectional Transformers for Language Understanding," arXiv preprint arXiv:1810.04805, 2019. (16pgs).
Dietz, et al.,"TREC Complex Answer Retrieval Overview," In Proceedings of the Twenty-Sixth Text REtrieval Conference (TREC), 2017. (13pgs).
Dinu et al.,"Improving zero-shot learning by mitigating the hubness problem," In Proc. of the 3rd International Conference on Learning Representations (ICLR), 2015. (10pgs).
Fei et al.,"Cross-Lingual Unsupervised Sentiment Classification with Multi-View Transfer Learning," In Proceedings of the 58th Annual Meeting of the Association for Computational Linguistics (ACL), 2020. (13pgs).
Guo et al.,"A Deep Relevance Matching Model for Ad-hoc Retrieval," arXiv preprint arXiv:1711.08611, 2017. (11pgs).
Guo et al.,"MatchZoo: A Learning, Practicing, and Developing System for Neural Text Matching," arXiv preprint arXiv: 1905.10289, 2019. (4pgs).
Gururangan et al., "Don't Stop Pretraining: Adapt Language Models to Domains and Tasks," arXiv preprint arXiv:2004.10964, 2020. (19pgs).
Hiemstra et al.,"Disambiguation Strategies for Cross-Language Information Retrieval," In Proceedings of the Third European Conference on Research & Advanced Technology for Digital Libraries (ECDL), 1999. (20pgs).
Hofstätter et al.,"Local Self-Attention over Long Text for Efficient Document Retrieval," arXiv preprint arXiv:2005.04908, 2020. (4pgs).
Hofstätter et al.,"Interpretable & Time-Budget-Constrained Contextualization for Re-Ranking," arXiv preprint arXiv:2002.01854, 2020. (8pgs).
Huang et al., "Unicoder: A Universal Language Encoder by Pre-training with Multiple Cross-lingual Tasks," arXiv preprint arXiv:1909.00964, 2019. (10ps).
Jiang et al.,"Cross-lingual Information Retrieval with BERT," arXiv preprint arXiv: 2004.13005, 2020. (6pgs).
Josifoski et al.,"Crosslingual Document Embedding as Reduced-Rank Ridge Regression," arXiv preprint arXiv:1904.03922, 2019. (9pgs).
Joulin et al.,"Loss in Translation: Learning Bilingual Word Mapping with a Retrieval Criterion," In Proceedings of the 2018 Conference on Empirical Methods in Natural Language Processing (EMNLP), 2018. (6pgs).
Kingma et al.,"Adam:A Method for Stochastic Optimization," In Proceedings of the 3rd International Conference on Learning Representations (ICLR), 2015. (15pgs).
Lample et al.,"Word translation without parallel data," In Proceedings of the 6th International Conference on Learning Representations (ICLR), 2018. (14pgs).
Lewis et al.,"MLQA: Evaluating Cross-lingual Extractive Question Answering,"In Proc. of the 58th Annual Meeting of the Association for Computational Linguistics(ACL),2020.(16p.
Litschko et al.,"Unsupervised Cross-Lingual Information Retrieval Using Monolingual Data Only," arXiv preprint arXiv: 1805.00879, 2018. (5pgs).
Liu et al.,"Roberta: A robustly optimized bert pretraining approach," arXiv preprint arXiv:1907.11692, 2019. (13pgs).
MacAvaney et al.,"Teaching a New Dog Old Tricks: Resurrecting Multilingual Retrieval Using Zero-Shot Learning," In Proceedings of the 42nd European Conference on IR Research (ECIR), 2020. (9pgs).
MacAvaney et al.,"CEDR:Contextualized Embeddings for Document Ranking," arXiv preprint arXiv:1904.07094, 2019. (4pgs).
Mosbach et al.,"On the Stability of Fine-tuning BERT: Misconceptions, Explanations, and Strong Baselines," arXiv preprint arXiv:2006.04884, 2021. (19pgs).
Ni et al.,"Mining multilingual topics from wikipedia," In Proceedings of the 18th International Conference onWorld Wide Web (WWW), 2009. (2pgs).
Nogueira et al.,"Passage Re-ranking with BERT," arXiv preprint arXiv:1901.04085, 2020. (5pgs).
Piccardi et al.,"Structuring Wikipedia Articles with Section Recommendations," arXiv preprint arXiv:1804.05995, 2018. (10pgs).
Ponte et al.,"A Language Modeling Approach to Information Retrieval," In Proc. of the 21st Annual International ACM SIGIR Conf. on Research & Development in Information Retrieval (SIGIR), 1998. (7pgs).
Radford et al.,"Language models are unsupervised multitask learners," OpenAI Blog 1, 8 (2019), 9, 2019. (24pgs).
Rajpurkar et al.,"SQuAD: 100, 000+ Questions for Machine Comprehension of Text," arXiv preprint arXiv:1606.05250, 2016. (10pgs).
Rücklé et al.,"Improved Cross-Lingual Question Retrieval for Community Question Answering," In Proceedings of the World Wide Web Conference (WWW), 2019. (8pgs).
Ruder et al.,"A Survey of Cross-lingual Word Embedding Models," arXiv preprint arXiv:1706.04902, 2019. (62pgs).
Shi et al.,"Cross-lingual relevance transfer for document retrieval," arXiv preprint arXiv:1911.02989, 2019. (5pgs).

(56) References Cited

OTHER PUBLICATIONS

Stein et al.,"Towards languageagnostic alignment of product titles descriptions: a neural approach," In Proceedings of the World Wide Web Conference (WWW), 2019. (6pgs).

Türe et al., "Flat vs. hierarchical phrase-based translation models for cross-language information retrieval," In Proceedings of the 36th International ACM SIGIR conference on research and development in Information Retrieval (SIGIR), 2013. (4pgs).

Vaswani et al., "Attention is All you Need," In Advances in Neural Information Processing Systems (NIPS), 2017. (11pgs).

Vulic et al.,"Monolingual and Cross-Lingual Information Retrieval Models Based on (Bilingual)Word Embeddings," In Proceedings of the 38th International ACM SIGIR Conference on Research and Development in Information Retrieval (SIGIR), 2015. (10pgs).

Xiong et al.,"End-to-End Neural Ad-hoc Ranking with Kernel Pooling," arXiv preprint arXiv:1706.06613, 2017. (10pgs).

Yang et al.,"Simple applications of BERT for ad hoc document retrieval," arXiv preprint arXiv:1903.10972, 2019. (6pgs).

Yang et al.,"XLNet: Generalized Autoregressive Pretraining for Language Understanding," arXiv preprint arXiv:1906.08237, 2020. (18pgs).

Yilmaz et al.,"Applying BERT to Document Retrieval with Birch," In Proc. of the 2019 Conf. on Empirical Methods in Natural Language Processing & the 9th International Joint Conf. on Natural Language Processing (EMNLPIJCNLP), 2019. (6pgs).

Yilmaz et al.,"Cross-Domain Modeling of Sentence-Level Evidence for Document Retrieval," In Proc. of the 2019 Conf. on Empirical Methods in Natural Language Processing & the 9th International Joint Conf. on Natural Language Processing (EMNLP-IJCNP), 2019. (7pgs).

Yu et al., "A Study of Neural Matching Models for Cross-lingual IR," arXiv preprint arXiv: 2005.12994, 2020. (4pgs).

* cited by examiner

*1300*

```
┌─────────────────────────────────────────────────┐
│ Given a CLIR model comprising a pretrained       │
│ cross-lingual LM + GSW attention model           │
│ embodiment and a CLIR model head,                │──╱─ 1305
│ initialize the parameters/weights of the CLIR    │
│ model head with either random values, the model  │
│ weights from the RR model head used in           │
│ pretraining, or a combination                    │
└─────────────────────────────────────────────────┘
                         │
                         ▼
┌─────────────────────────────────────────────────┐
│ Perform training using query-document pairs      │
│ (positive and negative samples) to update the    │──╱─ 1310
│ CL LM + GSW and the weights for the CLIR model   │
│ head                                             │
└─────────────────────────────────────────────────┘
                         │
                         ▼
┌─────────────────────────────────────────────────┐
│           Output the trained CLIR model          │──╱─ 1315
└─────────────────────────────────────────────────┘
```

FIG. 13

TABLE 4

| Query language | De | | | En | | | Es | | | Fr | | |
|---|---|---|---|---|---|---|---|---|---|---|---|---|
| Document language | En | Es | Fr | De | Es | Fr | De | En | Fr | De | En | Es |
| BWE-AGG-ADD | 0.126 | 0.280 | 0.194 | 0.186 | 0.247 | 0.133 | 0.238 | 0.118 | 0.190 | 0.234 | 0.116 | 0.273 |
| BWE-AGG-IDF | 0.146 | 0.325 | 0.235 | 0.197 | 0.258 | 0.147 | 0.238 | 0.132 | 0.221 | 0.224 | 0.125 | 0.293 |
| TbT-QT-QL | 0.361 | 0.344 | 0.229 | 0.263 | 0.395 | 0.310 | 0.244 | 0.396 | 0.308 | 0.215 | 0.327 | 0.357 |
| DRMM (smart-shuffling) | 0.143 | - | - | 0.226 | - | 0.133 | - | - | - | - | 0.156 | - |
| DRMM (fastText) | 0.195 | 0.304 | 0.164 | 0.238 | 0.313 | 0.187 | 0.264 | 0.192 | 0.143 | 0.225 | 0.211 | 0.284 |
| KNRM (smart-shuffling) | 0.199 | - | - | 0.274 | - | 0.194 | - | - | - | - | 0.167 | - |
| KNRM (fastText) | 0.227 | 0.337 | 0.263 | 0.285 | 0.372 | 0.250 | 0.310 | 0.187 | 0.240 | 0.298 | 0.180 | 0.345 |
| XLM-R | 0.124 | 0.233 | 0.178 | 0.269 | 0.307 | 0.222 | 0.211 | 0.149 | 0.212 | 0.199 | 0.148 | 0.293 |
| mBERT | 0.400 | 0.507 | 0.395 | 0.463 | 0.545 | 0.437 | 0.463 | 0.458 | 0.432 | 0.442 | 0.419 | 0.519 |
| Ours (mBERT-GSW) | 0.419* | 0.511* | 0.425* | 0.501* | 0.564* | 0.477* | 0.471* | 0.444* | 0.434* | 0.479* | 0.442* | 0.543* |
| Ours (mBERT, QLM-RR, 10) | 0.472* | 0.555* | 0.476* | 0.524* | 0.577* | 0.495* | 0.524* | 0.489* | 0.499* | 0.518* | 0.476* | 0.588* |
| Ours (mBERT, QLM-RR, 20) | 0.472* | 0.573* | 0.476* | 0.534* | 0.599* | 0.516* | 0.528* | 0.491* | 0.504* | 0.524* | 0.497* | 0.594* |
| Ours (mBERT-GSW, QLM-RR, 10) | 0.501* | 0.581* | 0.491* | 0.536* | 0.614* | 0.527* | 0.540* | 0.530* | 0.519* | 0.536* | 0.520* | 0.602* |
| Ours (mBERT-GSW, QLM-RR, 20) | 0.519* | 0.601* | 0.506* | 0.545* | 0.621* | 0.524* | 0.554* | 0.545* | 0.534* | 0.550* | 0.592* | 0.616* |

FIG. 16

TABLE 5

| Task | G-XLT | | | | | | XLT | |
|---|---|---|---|---|---|---|---|---|
| Language pair (Q-A) | De-En | De-Es | En-De | En-Es | Es-De | Es-En | De-De | Es-Es |
| XLM-R | 57.8/42.9 | 41.4/28.5 | 57.8/45.2 | 54.4/41.0 | 49.5/32.2 | 63.9/43.5 | 60.8/45.3 | 64.8/44.3 |
| mBERT | 60.1/44.6 | 53.7/40.0 | 63.7/50.3 | 64.1/49.8 | 57.5/38.7 | 64.4/43.3 | 60.7/44.5 | 63.7/42.2 |
| Ours (mBERT-GSW) | 60.9/45.6 | 55.3*/39.9 | 65.1/51.2 | 64.7/51.2 | 58.9/40.2* | 65.1/44.4 | 61.5/45.5 | 64.8/43.3 |
| Ours (mBERT, QLM-RR, 10) | 62.6*/46.5* | 56.4*/39.8 | 70.6*/56.4* | 68.3*/55.2* | 62.6*/40.0 | 67.3*/45.8* | 61.9/44.9 | 63.9/41.8 |
| Ours (mBERT, QLM-RR, 20) | 62.3*/45.6 | 61.4*/44.6* | 73.2*/58.9* | 71.6*/57.1* | 65.9*/43.5* | 68.3*/46.7* | 62.5*/46.4* | 66.5*/44.1* |
| Ours (mBERT-GSW, QLM-RR, 10) | 63.5*/46.8* | 59.3*/42.7* | 72.1*/58.4* | 69.2*/53.0* | 64.9*/44.0* | 67.7*/46.1* | 61.6/44.3 | 65.2/42.2 |
| Ours (mBERT-GSW, QLM-RR, 20) | 63.7*/47.3* | 60.8*/43.5* | 73.5*/60.2* | 71.5*/57.0* | 65.0*/42.7* | 68.1*/46.1* | 62.4*/46.6* | 66.1*/44.8* |

FIG. 17

CROSS-LINGUAL LANGUAGE MODELS AND PRETRAINING OF CROSS-LINGUAL LANGUAGE MODELS

CROSS-REFERENCE TO RELATED APPLICATION

This patent application is related to and claims priority benefit under 35 USC § 119 to and commonly-owned U.S. Pat. App. No. 63/171,024, filed on 5 Apr. 2021, entitled "CROSS-LINGUAL LANGUAGE MODELS AND PRETRAINING OF CROSS-LINGUAL LANGUAGE MODELS," and listing Hongliang Fei, Puxuan Yu, and Ping Li as inventors (BN210305USN1-Provisional)), which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods searching, especially for cross-lingual searching.

B. Background

Cross-lingual ad-hoc retrieval (CUR) refers to the task of retrieving documents in the target language $L_t$ with queries written in the source language $L_s$. A search engine with better CLIR capability has a broader impact, as it can fulfill information needs of more users across language barriers.

Recently, the use of monolingual pretrained language models based on Transformer neural networks (e.g., BERT, which is discussed in Jacob Devlin, Ming-Wei Chang, Kenton Lee, and Kristina Toutanova. 2019. BERT: Pretraining of Deep Bidirectional Transformers for Language Understanding. In *Proceedings of the 2019 Conference of the North American Chapter of the Association for Computational Linguistics: Human Language Technologies (NAACL-HLT)*. Minneapolis, MN, 4171-4186 (hereinafter, "Devlin et al. (2019)")) for ad-hoc retrieval in English has advanced the performance in the literature to a large degree. For instance, almost all leading competitors in the MS MARCO passage and document retrieval tasks rely on Transformer-based pretrained language models. In the meantime, multilingual language models (e.g., mBERT (Devlin et al. (2019)) and XLM (Alexis Conneau and Guillaume Lample. 2019. Cross-lingual Language Model Pretraining. In *Advances in Neural Information Processing Systems (NeurIPS)*. Vancouver, Canada, 7057-7067 (hereinafter, Conneau et al. (2019))) were proposed, and they have been proven to perform well on various downstream cross-lingual tasks, such as cross-lingual text classification, cross-lingual named entity recognition, and supervised/unsupervised machine translation. Nevertheless, the wave of multilingual language models has not yet benefited CLIR.

Most related research focuses on the success of cross-lingual relevance transfer. The language model is first finetuned on monolingual collection in language $L_s$ with more labelled data, and then applied for inference to monolingual retrieval in another language $L_t$, where there is usually less available training data. This task, though significantly important, is different from cross-lingual ad-hoc retrieval. In CLQA (cross-lingual question answering) literature, cross-lingual relevance transfer is directly referred to as cross-lingual transfer (dubbed XLT), while the "real" cross-lingual task where question and context are in different languages is called generalized cross-lingual transfer (G-XLT). In this patent document, this naming convention is inherited.

The state-of-the-art methodology for CLIR is generally using learning-to-rank with neural matching models coupled with pre-acquired cross-lingual word embeddings (CLE). A few endeavors to adopt multilingual language models for CLIR have shown that such models perform inferior to a big margin compared with learning-to-rank with CLE. There is a gap between how language models should be used for monolingual (English) ad-hoc retrieval and cross-lingual ad-hoc retrieval.

Accordingly, what is needed are systems and methods that address gaps in language models and language model performance, which may be used for various purposes, such as CLIR and CLQA.

SUMMARY

Existing research on cross-lingual retrieval cannot take good advantage of large-scale pretrained language models such as multilingual BERT and XLM. The absence of cross-lingual passage-level relevance data for finetuning and the lack of query-document style pretraining are key factors of this issue. Presented herein are novel retrieval-oriented pretraining tasks to further pretrain cross-lingual language models for downstream retrieval tasks such as cross-lingual ad-hoc retrieval (CUR) and cross-lingual question answering (CLQA).

In one or more embodiments, distant supervision data from multilingual resources are constructed using section alignment to support retrieval-oriented language model pretraining. Embodiments are also presented herein to directly finetune language models on part of the evaluation collection by making Transformers capable of accepting longer sequences. Experiments on multiple datasets show that embodiments significantly improve upon general multilingual language models in both the cross-lingual retrieval setting and the cross-lingual transfer setting.

System, method, and computer-readable media embodiments for pretraining a cross-lingual language model may comprise: given a relevance ranking batch of cross-lingual query and document pairs, using the cross-lingual language model with a relevance ranking model head to predict a relevance ranking that ranks whether a document is relevant to a corresponding query; updating the cross-lingual language model using known relevance rankings and predicted relevance rankings; given a query language modeling batch of cross-lingual query and document pairs, in which the query and the document are in different languages and the document is relevant to the query, inputting the query, in which a portion of tokens in the query are masked tokens, and the corresponding document into a cross-lingual language model to predict the masked tokens of the query; and updating the cross-lingual language model based upon the cross-lingual language model's prediction compared to the actual masked tokens. In one or more embodiments, responsive to a stop condition not being reached, the above-mentioned steps are repeated, and responsive to a stop condition being reached, the pretrained cross-lingual language model is output. It shall be noted that the order of whether relevance ranking is trained first or query language modeling is trained first does not matter.

In one or more embodiments, system, method, and computer-readable media embodiments comprise obtaining the relevance ranking batch by sampling a batch of cross-lingual query and document pairs, in which the relevance ranking batch comprises (1) at least one positive sample cross-lingual query and document pair, in which the query and the document are in different languages and the document is relevant to the query and (2) at least one negative sample cross-lingual query and document pair, in which the query and the document are in different languages and the document is not relevant to the query.

In one or more embodiments, system, method, and computer-readable media embodiments comprise obtaining the query language modeling batch by sampling a batch of cross-lingual query and document pairs, in which the query and the document are in different languages and the document is relevant to the query.

In one or more embodiments, the cross-lingual language model comprises global-plus-sliding window attention, in which a global window for attention is used for query tokens and a sliding window for attention is used for at least some document tokens.

In one or more embodiments, the cross-lingual language model may be initially obtained by performing steps comprising: obtaining a pretrained multilingual language representation model that comprises an attention module and that has been trained with a masked language modeling (MLM) task objective; replacing the attention module in the pretrained multilingual language representation model with global-plus-sliding window attention to obtain a modified language model; updating the modified language model using an MLM task objective and a dataset to improve its performance as compared with the pretrained multilingual language representation model; and outputting the updated modified language model as the cross-lingual language model that is used for pretraining.

In one or more embodiments, at least one of the sampling steps comprises sampling from a number of different languages to train the pretrained cross-lingual language model to accept each of a number of different languages as inputs and to output each of a number of different languages as outputs.

In one or more embodiments, cross-lingual data may be obtained by matching sections of a multilingual resource or resources related to a same subject matter and sampling a sentence or a portion thereof from a matched section in a first language as a query and using the matched section or a portion thereof in a different language as a cross-lingual document.

In one or more embodiments, the pretrained cross-lingual language model may be used for one or more downstream tasks. For example, in one or more embodiments, a cross-lingual information retrieval (CLIR) model comprising the pretrained cross-lingual language model and a CLIR model head may be trained by performing steps comprising: initializing parameters or weights of the CLIR model head with either random values, the model weights from the relevance ranking model head used in pretraining, or a combination; performing training using positive and negative query-document pairs to update parameters or weights of the pretrained cross-lingual language model, of the CLIR model head, or both; and outputting the trained CLIR model. And, for example, in one or more embodiments, a cross-lingual question-answer (CLQA) model comprising the pretrained cross-lingual language model and a CLQA model head may be trained by performing steps comprising: initializing parameters or weights of a CLQA model head; performing training using training samples to update parameters or weights of the pretrained cross-lingual language model, of the CLQA model head, or both; and outputting the trained CLQA model.

System, method, and computer-readable media embodiments for pretraining a cross-lingual language model may comprise: responsive to a stop condition not being reached, performing steps comprising: (1) given cross-lingual query and document pairs in which at least some of query tokens of a query input into the cross-lingual language model are masked, training the cross-lingual language model using a query language model objective regarding predicting, for a query, the masked query tokens given a corresponding relevant cross-lingual document; and (2) given cross-lingual query and document pairs, training the cross-lingual language model with a relevance ranking model head to predict a relevance ranking that ranks whether a document is relevant to a corresponding query; and responsive to a stop condition being reached, outputting the pretrained cross-lingual language model. It shall be noted that the order of whether relevance ranking is trained first or query language modeling is trained first does not matter.

In one or more embodiments, the cross-lingual language model may comprise global-plus-sliding window attention, in which a global window for attention is used for query tokens and a sliding window for attention is used for at least some document tokens.

In one or more embodiments, a pretrained multilingual language representation model may be used to initialize the cross-lingual language model.

In one or more embodiments, system, method, and computer-readable media embodiments may initialize the cross-lingual language model by performing steps comprising: obtaining a pretrained multilingual language representation model that comprises an attention module and that has been trained with a masked language modeling (MLM) task objective; replacing the attention module in the pretrained multilingual language representation model with global-plus-sliding window attention to obtain a modified language model; updating the modified language model using an MLM task objective and a dataset to improve its performance as compared with the pretrained multilingual language representation model; and outputting the updated modified language model as the cross-lingual language model that is used for pretraining.

In one or more embodiments, system, method, and computer-readable media embodiments may obtain cross-lingual query and document pairs for training the cross-lingual language model with the relevance ranking model head by performing steps comprising: sampling a set of cross-lingual query and document pairs, in which the set comprises: at least one positive sample cross-lingual query and document pair, in which the query and the document are in different languages and the document is relevant to the query; and at least one negative sample cross-lingual query and document pair, in which the query and the document are in different languages and the document is not relevant to the query.

In one or more embodiments, system, method, and computer-readable media embodiments may obtain cross-lingual query and document pairs for training the cross-lingual language model with the query language model objective by performing steps comprising sampling a set of cross-lingual query and document pairs, in which the query and the document are in different languages and the document is relevant to the query.

In one or more embodiments, at least one of the sampling steps comprises sampling from a number of different languages to train the pretrained cross-lingual language model to accept each of a number of different languages as inputs and to output each of a number of different languages as outputs.

In one or more embodiments, the pretrained cross-lingual language model may be used for one or more downstream tasks, such as cross-lingual information retrieval (CLIR) and/or cross-lingual question-answering (CLQA).

Some features and advantages of embodiments of the present invention have been generally described in this summary section; however, additional features, advantages, and embodiments are presented herein or will be apparent to one of ordinary skill in the art in view of the figures, specification, and claims hereof. Accordingly, it should be understood that the scope of the present invention shall not be limited by the particular embodiments disclosed in this summary section.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 depicts INSERT, according to embodiments of the present disclosure.

FIG. 13 depicts a method for training a cross-lingual information retrieval (CLIR) system that uses a pretrained cross-lingual language model (LM) with global+sliding window (GSW) attention (cross-lingual LM+GSW attention) model, according to embodiments of the present disclosure.

FIG. 16 contains results of CLIR performance on CLEF for various models, including model embodiments according to embodiments of the present disclosure.

FIG. 17 contains results of CLQA performance on a multi-lingual question answering dataset for various models, including model embodiments according to embodiments of the present disclosure. Numbers are F1/Exact-Match scores (%) in percentile format by convention. Best performance on each language pair is marked bold. "*" indicates statistically significant improvement over mBERT ($p<0.05$).

DETAILED DESCRIPTION OF EMBODIMENTS

Figure 1:
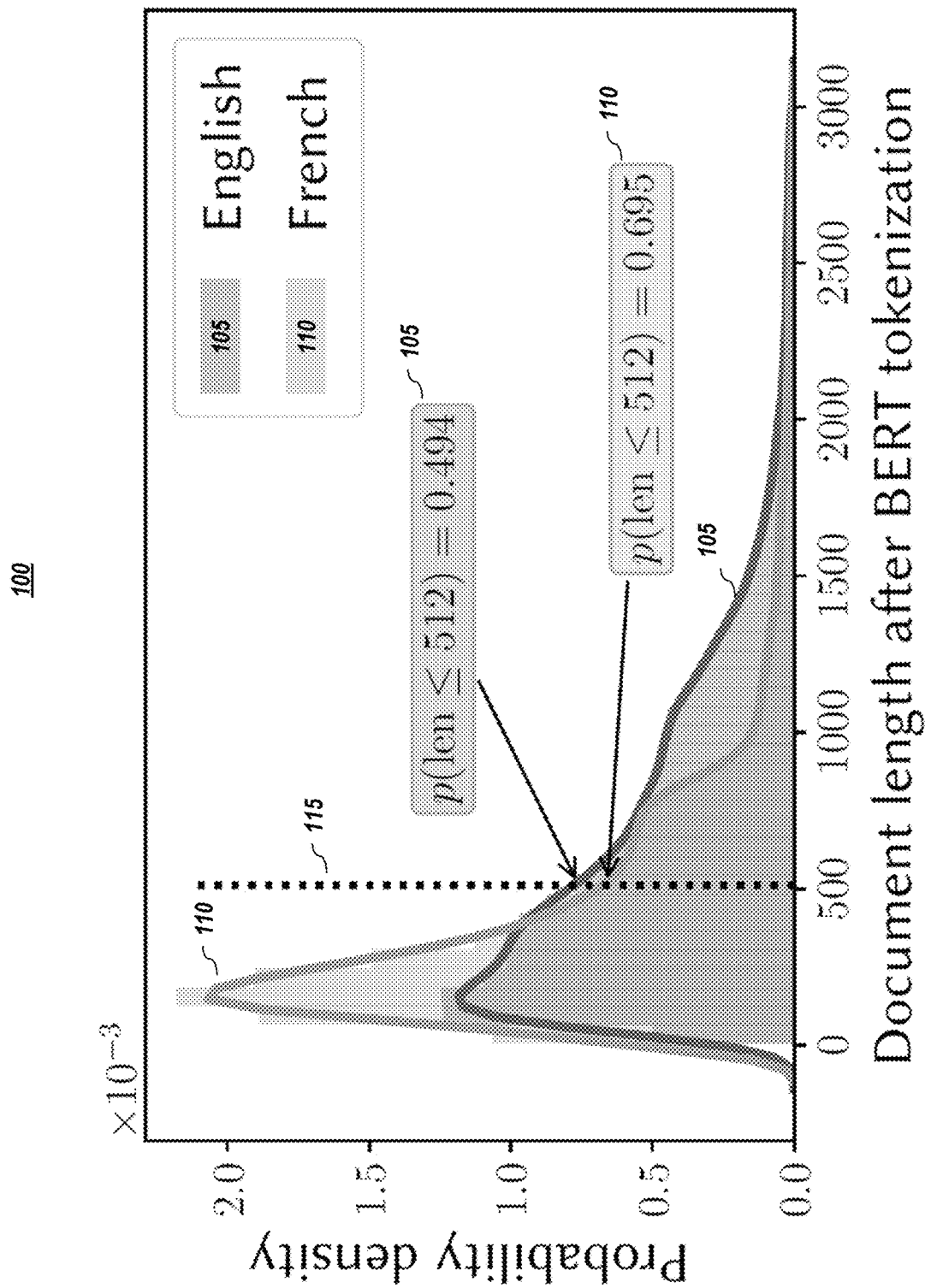

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms, and any lists that follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

In one or more embodiments, to address the deficiencies of prior cross-lingual (CL) language models (LMs), differences between pretraining and applying cross-lingual LMs are considered. A prerequisite assumption to use cross-lingual LM for retrieval is that representations are well aligned across languages on multiple levels of text segments (i.e., word, sentence, paragraph, and document). Conneau et al. (2020) (Alexis Conneau, Shijie Wu, Haoran Li, Luke Zettlemoyer, and Veselin Stoyanov. 2020. Emerging Cross-lingual Structure in Pretrained Language Models. In *Proceedings of the 58th Annual Meeting of the Association for Computational Linguistics (ACL)*. Online, 6022-6034) showed that representations from monolingual BERT in different languages can be linearly mapped to one another on both word and sentence levels, and that the success of a unified cross-lingual LM is mostly due to parameter sharing in upper encoder layers. Both mBERT and XLM focus on word-level and sentence-level tasks during pretraining: the masked language modeling task (MLM) trains the model to fill the blanks of monolingual sentences, while the translation language modeling task (TLM) challenges the model to fill the blanks in pairs of parallel sentences. The fact that they perform well on word and sentence level tasks but poorly on retrieval tasks suggests that representations of longer sequences might not be well aligned in cross-lingual LMs.

To that end, at least two novel pretraining objectives for better aligning representation of longer texts and better modeling of query-document interactions are presented herein:

In one or more embodiments, a query language modeling task (QLM) masks some query tokens and asks a model embodiment to predict the masked tokens based on query contexts and full relevant foreign document. In one or more embodiments, the masking probability is specifically increased compared to autoencoder language modeling tasks to enforce referencing cross-lingual long sequences.

In one or more embodiments, a relevance ranking task (RR) operates on more coarse-grained representations and directly resembles the cross-lingual ad-hoc retrieval task. Given a query and several foreign documents, a model embodiment is asked to rank these documents based on levels of relevance.

At least some of the cross-lingual LM embodiments herein are not fully "self-supervised," as some knowledge about query-document relevance for both pretraining objectives is used. Embodiments of a simple yet effective approach for building such distant weakly-supervised data from multilingual data are also described herein. Specifically, in one or more embodiments, sections of multilingual versions of data entities are matched based on cross-lingual representation of section titles. For each pair of matched document sections, a sentence is sampled from one section as a query, and the other section is used as a relevant document. Text sections, such as Wiki, are sources for more fine-grained semantics in various retrieval datasets, and, in one or more embodiments, this concept is extended to multilingual texts. In one or more embodiments, millions of raw matched sections were generated for each language pair. Therefore, this data extraction scheme is a good balancing point between quantity and quality for the pretraining tasks embodiments herein.

The pretrain-finetune-inference paradigm of using language models for ad-hoc retrieval is re-evaluated herein. Due to the square time and memory complexity of Transformer's full self-attention mechanism, Transformers and thus language models have a small upper limit on the input sequence length (e.g., 512 tokens for BERT). However, in most circumstances, 512 tokens are not enough to encode the query and the full document whilst performing finetuning. Consider FIG. 1, which depicts the distribution of document length in a dataset for English and French documents. In FIG. 1, the position for 512 tokens is marked 115 for reference. Realistically, documents with 512 tokens cannot fit considering the length of queries. Current research on monolingual retrieval either truncates the documents such that the input sequences meet the size requirement, or finetune language models on passage-level collections and then performs inference on longer test collection by post-aggregating relevance scores of document segments. However, it shall be noted that truncating documents results in some degree of information loss. Also, there does not exist any multilingual passage-level relevance dataset like MS MARCO for English retrieval. Embodiments herein seek to finetune LMs for downstream retrieval tasks directly on evaluation collections (similar to non-retrieval cross-lingual tasks), but also seek to minimize information loss in the process. To that end, in one or more embodiments, the self-attention mechanism in Transformer is replaced with a global+sliding window (GSW) attention to unlock the ability of cross-lingual LM to process longer sequences in the "inside-Transformer" way. Note that there is also an "outside-Transformer" solution, where the original Transformer slides over a document, and a parameterized saturation function aggregates the windows and outputs a score. In comparison, embodiments herein are more computationally efficient, especially considering they also perform large-scale pretraining besides finetuning.

Some of the contributions of embodiments include, but are not limited to:

Embodiments of two novel retrieval-oriented tasks for pretraining cross-lingual language models are presented herein. In one or more embodiments, weak-supervision data is built to support cross-lingual LM pretraining with these tasks.

Global+sliding-window attention is employed in cross-lingual language model embodiments to better align longer text representations across languages in both pretraining and finetuning stages, whilst minimizing information loss.

Embodiments were extensively evaluated on downstream CLIR and CLQA tasks. Detailed experiments were also conducted to support the rationale of each component from the empirical perspectives. For CLIR, an embodiment achieved 13.9%-29.7% MAP improvement over vanilla mBERT re-ranker in all 12 language pairs on a bench-marking CLEF dataset. For a cross-lingual QA dataset, 1.7 and 2.8 points F1 improvement under XLT setting (German and Spanish) were seen, and 3.6-9.8 points F1 improvement under G-XLT setting (6 language pairs) over mBERT on a multilingual QA dataset was seen.

For convenience, the following table is provided.

TABLE 1

Frequently used acronyms in this paper.

| | |
|---|---|
| CLE | Cross-lingual word embeddings. |
| (G-)XLT | (Generalized) Cross-lingual Transfer. |
| MLM | Masked Language Modeling task. |
| TLM | Translation Language Modeling task. |
| QLM | Query Language Modeling task embodiment proposed in this paper. |
| RR | Relevance Ranking modeling task proposed in this paper. |
| XLM(-R) | Cross-lingual language models.[1] |
| GSW | Global + Sliding Window attention mechanism. |

[1]Cross-lingual language models as proposed in: (1) Alexis Conneau, Kartikay Khandelwal, Naman Goyal, Vishrav Chaudhary, Guillaume Wenzek, Francisco Guzmán, Edouard Grave, Myle Ott, Luke Zettlemoyer, and Veselin Stoyanov. 2020. Unsupervised Cross-lingual Representation Learning at Scale. In *Proceedings of the 58th Annual Meeting of the Association for Computational Linguistics (ACL)*. Online, 8440-8451 (hereinafter, "Conneau et al. (2020b)); and (2) Conneau et al. (2019).

B. Related Work

1. Cross-lingual Ad-hoc Retrieval

Cross-lingual ad-hoc retrieval has always been considered as the combination of machine translation and monolingual ad-hoc retrieval. The initial translation resources are borrowed from the field of statistical machine translation (SMT). Some earlier works use word-by-word translation. Some developers used translation tables from SMT to translate a query into a structured probabilistic structured query. CUR methods gradually shifted towards using cross-lingual word embeddings as translation resources. There are generally two ways to acquire CLE: pseudo-bilingual and post-projection. Some developers have proposed heuristics to use CLE for cross-lingual ad-hoc retrieval. Recently, the combination of neural matching models and CLE was proposed for document re-ranking and has yielded impressive performance on standard benchmarks.

2. Pretrained LM for Monolingual IR

Pretrained language models have brought a revolution to the field of human language technologies in general. BERT is used as an example here, but other language models may be used. There are two main approaches to apply BERT for ad-hoc retrieval: (i) single-tower: a query-document pair is packed into one sequence, separated by a [sep] token and then fed into one BERT encoder. Every query/document token can attend to the whole sequence during encoding (also referred to as cross-attention). The output representation of the [cls] token is taken for predicting ranking score; and (ii) two-tower: query and document are encoded with separate BERT encoders. The matching score is the similarity (e.g., cosine similarity) of the two sequence embeddings. Two-tower models are more efficient for indexing query and document vector representations and are usually used in first-stage retrieval, while single tower models with full cross-attention are usually used for final-stage document re-ranking. For document re-ranking, it was shown that incorporating term-level matching signals from contextualized word embeddings in addition to outputting the [cls] vector from cross-attention can provide additional improvement. Embodiments here address the re-ranking problem, and embodiments use the single-tower model without resorting to term-level matching for simplicity.

3. Cross-lingual Pretrained LM

Cross-lingual pretrained language models are capable of simultaneously encoding texts from multiple languages. Multilingual BERT (Devlin et al. (2019)) takes the same model structure and training objective as BERT, but was pretrained on more than 100 languages on Wikipedia. In addition to the masked language modeling (MLM) objective, the XLM model (Conneau et al. (2019)) is also pretrained with the translation language modeling objective (TLM) to take advantage of parallel sentence resources if available: a pair of parallel sentences are randomly masked, and the language model is challenged to predict the masked tokens by attending to local contexts as well as distant foreign contexts. XLM-RoBERTa (Conneau et al. (2020b)) improved upon XLM by incorporating more training data. Two additional word-level and sentence-level tasks were proposed to pretrain the Unicoder. Evaluations on a series of word-level and sentence-level cross-lingual transfer tasks have shown that these cross-lingual LMs have significant utilities for transferring language knowledge from high-resource languages to low-resource languages.

In the contexts of retrieval, there are also research works on cross-lingual transfer for ad-hoc retrieval and question answering. But different from cross-lingual transfer, using a single-tower model for cross-lingual retrieval requires the language model to encode two sequences (CLIR: query/document, CLQA: question/context) from different languages in the same pass. Some developers reported unsuccessful attempts to use a single-tower model and CEDR-like matching model for CLIR by stating that pre-trained models with many languages are not providing high gain for CLIR and needs further investigations for fine-tuning or training". It appears that there is only one detailed report about using a single-tower model for CLIR (Zhuolin Jiang, Amro El-Jaroudi, William Hartmann, Damianos G. Karakos, and Lingjun Zhao. 2020. Cross-lingual Information Retrieval with BERT. In *Proceedings of the workshop on Cross-Language Search and Summarization of Text and Speech (CLSSTS@LREC)*. Marseille, France, 26-31 (hereinafter, "Jiang et al. (2020)), in which the proposed method decoupled the query into terms and the document into sentences. Therefore, their model's complexity is squared on the basis of vanilla BERT cross-attention and thus far from practical. In contrast, embodiments herein are capable of encoding bilingual full query and document in one pass.

C. Model Structure Embodiments

Figure 2:
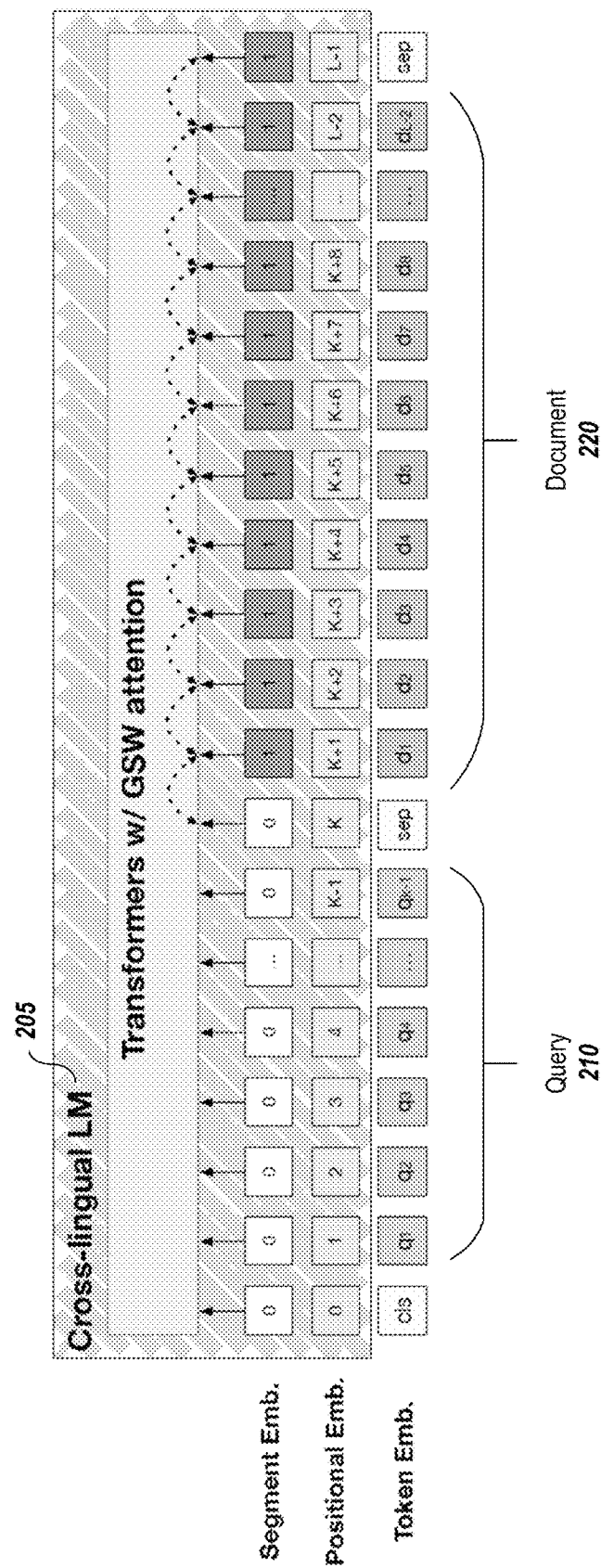
FIG. 2 graphically depicts a cross-lingual language model, according to embodiments of the present disclosure.

The structure of an embodiment of the cross-lingual LM 205 is illustrated in FIG. 2. Document tokens 220 can attend to neighboring tokens in a w-token window, while query tokens have global attention. For illustration in FIG. 2, the w-token window was set to w=2, although other values may be used. In experiments, larger window sizes (w={32, 64, 128, 256}) were used.

As illustrated, the input is a packed sequence containing one query 210 and one document 220 with [sep] token in between. To encourage learning language-agnostic representations, unlike XLM, embodiments do not supplement language-specific embeddings. Instead, in one or more embodiments, input segment embeddings are input to let the model embodiment differentiate between two parts of the input.

A large portion of documents in CLIR datasets (and in real applications of CLIR generally) exceed the input length limit of mBERT and XLM—see, e.g., FIG. 1. Cross-lingual LM embodiments herein are built to encode more document content at pretraining, finetuning, and inference stages. Embodiments adopt an attention mechanism like that used in Longformer (Iz Beltagy, Matthew E Peters, and Arman Cohan. 2020. Longformer: The long-document transformer. arXiv preprint arXiv:2004.05150 (2020) (hereinafter, "Longformer (2020)) to replace full self-attention as with mBERT, such that each Transformer block can encode longer sequences. Compared with other's solution that slides a vanilla Transformer over long documents for finetuning monolingual language models, embodiments herein are more computationally efficient, especially at the pretraining stage.

Longformer is the long-document Transformer, where the $O(n^2)$ complexity self-attention is replaced with a series of linear attention mechanisms. Specifically, in one or more embodiments, a "global+sliding window" (GSW) attention is used. Embodiments let query tokens have global attention and limit document tokens to sliding-window attention. Within each Transformer, all query tokens still attend to any other tokens in the sequence, but document tokens attend to tokens within a w-token wide window, as illustrated in FIG. 2. In one or more embodiments, special tokens like [sep] and [cls] also have global attentions. An example of a Transformer is discussed in Ashish Vaswani, Noam Shazeer, Niki Parmar, Jakob Uszkoreit, Llion Jones, Aidan N. Gomez, Lukasz Kaiser, and Illia Polosukhin. 2017. Attention is All You Need. In *Advances in Neural Information Processing Systems (NIPS)*. Long Beach, CA, 5998-6008. A Transform may compute attention scores as follows:

$$\text{Attention}(Q, K, V) = \text{softmax}\left(\frac{QK^T}{\sqrt{d_k}}\right)V, \quad (1)$$

in which the input is queries and keys of dimension $d_k$, and values of dimension $d_v$. The dot products of the query with all keys are computed, which are each divided by $\sqrt{d_k}$, and a softmax function is applied to obtain the weights on the values. Q represents a matrix of queries, K represents a matrix of keys, and V represents a matrix of values, which all may be used to compute the attention function on a set of queries.

A GSW embodiment, on the other hand, may use two sets of projections, $\{Q_s, K_s, V_s\}$ to compute attention scores of sliding window attention, and $\{Q_g, K_g, V_g\}$ to compute attention scores for the global attention. Intuitively, one may regard GSW as relocation of computation power: instead of letting two long-distance document tokens attend to each other, embodiments can instead let query tokens attend to more document tokens. In practice, comparing (a) full self-attention with maximum sequence length 512 and (b) GSW attention with maximum sequence length 1024 and window size 64 both using single-tower model, it was observed that (i) they consume similar GPU memory; (ii) GSW runs slightly slower; and (iii) GSW is capable of encoding documents more than twice as long. Empirical comparisons of their effectiveness are presented below.

D. Retrieval-Oriented Cross-Lingual Language Model Pretraining Embodiments

One goal of task-specific language model pretraining is to further enhance the model's performance on downstream tasks by taking advantage of weak-supervision data applied to task-specific modeling objectives. Weak-supervision data construction and retrieval-oriented cross-lingual modeling tasks are described in this section.

1. Data

General requirements of the ideal pretraining data for the tasks herein include: (i) each positive example contains a pair of short text (query) and long text (document) in different languages; (ii) query and document are semantically related; (iii) the number of training examples is sufficiently large.

Figure 3:
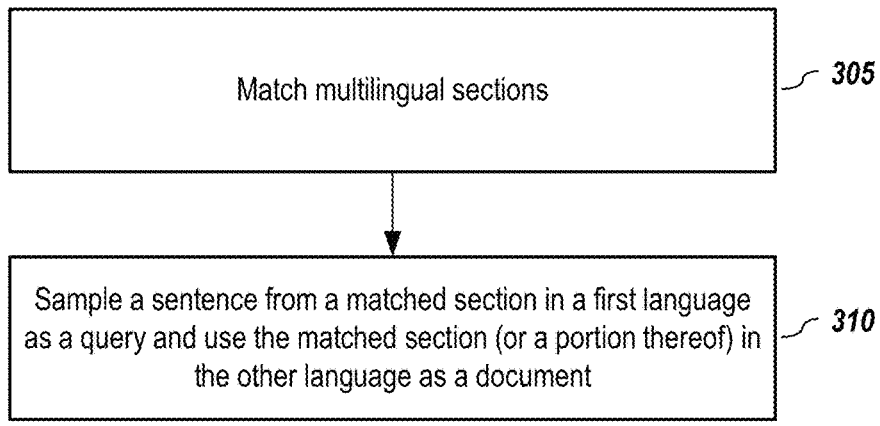
FIG. 3 depicts a method for pretraining data generation, according to embodiments of the present disclosure.

FIG. 3 depicts a method for pretraining data generation, according to embodiments of the present disclosure. There is a trade-off between the granularity of semantic relatedness and the number of available training examples, and data with headings (e.g., Wiki sections) have a good balance point. To that end, multilingual sections of corresponding documents in a different language are matched (305). It shall be noted that, in one or more embodiments, the sections may not be direct language translations, but rather they represent sections that discuss the same topic or topics. A sentence (which may be a phrase of one or more words) is sampled (310) from a matched section in a first language as a query and the matched section (or a portion thereof) in the other language is sampled as a corresponding document. This approach is motivated by the discussion on the granularities of semantics in monolingual Wiki. While this approach may be considered to be conceptually similar to the Inverse Cloze Task (ICT), where one sentence is sampled from a Wiki paragraph as query, and the rest of the paragraph is treated as document, there are some key differences. The key differences include (but are not limited to): (i) embodiments herein expand from monolingual to multilingual; (ii) longer texts are kept (section vs. paragraph) as document, which is more similar to downstream retrieval tasks.

However, accurate cross-lingual section alignment information, even for Wiki content, is typically unavailable. Multilingual content (e.g., multilingual Wiki pages) of the same entity are usually not a translation of one another, and they are often organized to have different structures. In fact, section alignment of multilingual Wiki is itself an active research question. In one or more embodiments, an efficient and effective method for section alignment based on cross-lingual word embeddings (CLE) was employed.

Figure 4:
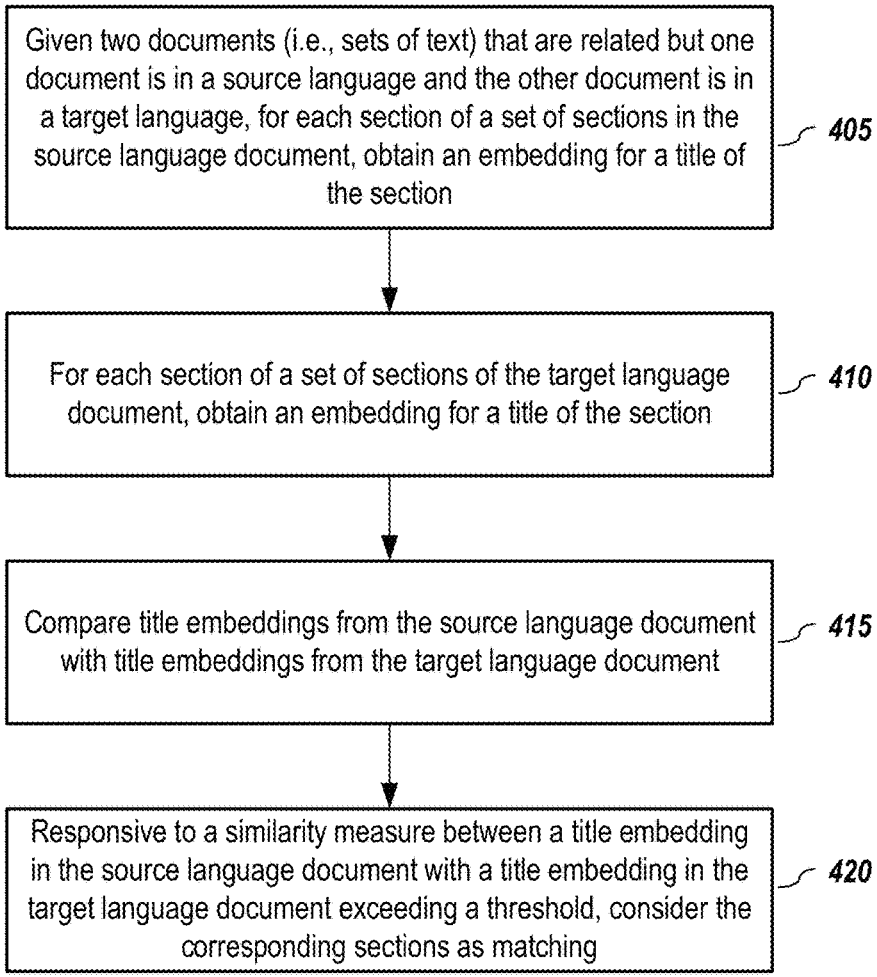
FIG. 4 depicts a method for multilingual data generation, according to embodiments of the present disclosure.

FIG. 4 depicts a method for multilingual data generation, according to embodiments of the present disclosure. Suppose Page$_s$ and Page$_t$ are two documents (e.g., two Wiki pages) in source and target languages, respectively, of the same entity. A section's title may be defined as its immediate preceding title. For each section Sec$_s$(i) in Page$_s$, its title embedding is acquired (405). In one or more embodiments, the embedding for the title may be obtained by averaging the CLE of all its title's terms (with stopwords removed). The embeddings for each section Sec$_t$(j) in Page$_t$ may similarly be obtained (410). The title embeddings from the source language document may be compared (415) with title embeddings from the target language document. If the similarity (e.g., cosine similarity or other similarity measures) of a title embedding of Sec$_s$(i) and a title embedding Sec$_t$(j) is greater than a threshold value η, these sections may be considered (420) as matched sections. The underlying assumptions are that: (i) titles are accurate summaries of section content; (ii) matched sections are related to the same aspect of the same entity. Conceptually, the relatedness of matched sections is "lower-bounded" such that in worst cases, two sections are related to different aspects of the same entity, which is still acceptable for retrieval. Note that given two languages, in one or more embodiments, one section is allowed to match with at most one foreign section, and the highest matching pair may be selected if there is conflict. The quality of the data may be reflected by performance of the pretrained model on downstream tasks as discussed in the Experiments section, below.

It shall be noted that model embodiments and data construction method embodiments support any language present in multilingual Wiki. Four languages {English (En), Spanish (Es), French (Fr), German (De)} were selected for demonstration and convenience of evaluation. FastText CLE was used η was set to η=0.3 (note that CLE usually has lower cosine similarities than monolingual embeddings). Filtering was applied such that a pair of matched sections had at least five sentences in both sections. The numbers of aligned sections that were created are listed in TABLE 2.

TABLE 2

Number of aligned sections in each language pair.

| En&De | En&Es | En&Fr | Es&De | Fr&De | Fr&Es |
|---|---|---|---|---|---|
| 250.6K | 295.8K | 202.8K | 169.9K | 216.7K | 171.4K |

2. Pretraining Tasks Embodiments

Given the described massive cross-lingual query-document relevance data, at least two novel pretraining tasks or objectives for cross-lingual retrieval were developed—query language modeling (QLM) and relevance ranking (RR).

a) Query Language Modeling (QLM) Embodiments

Figure 5:
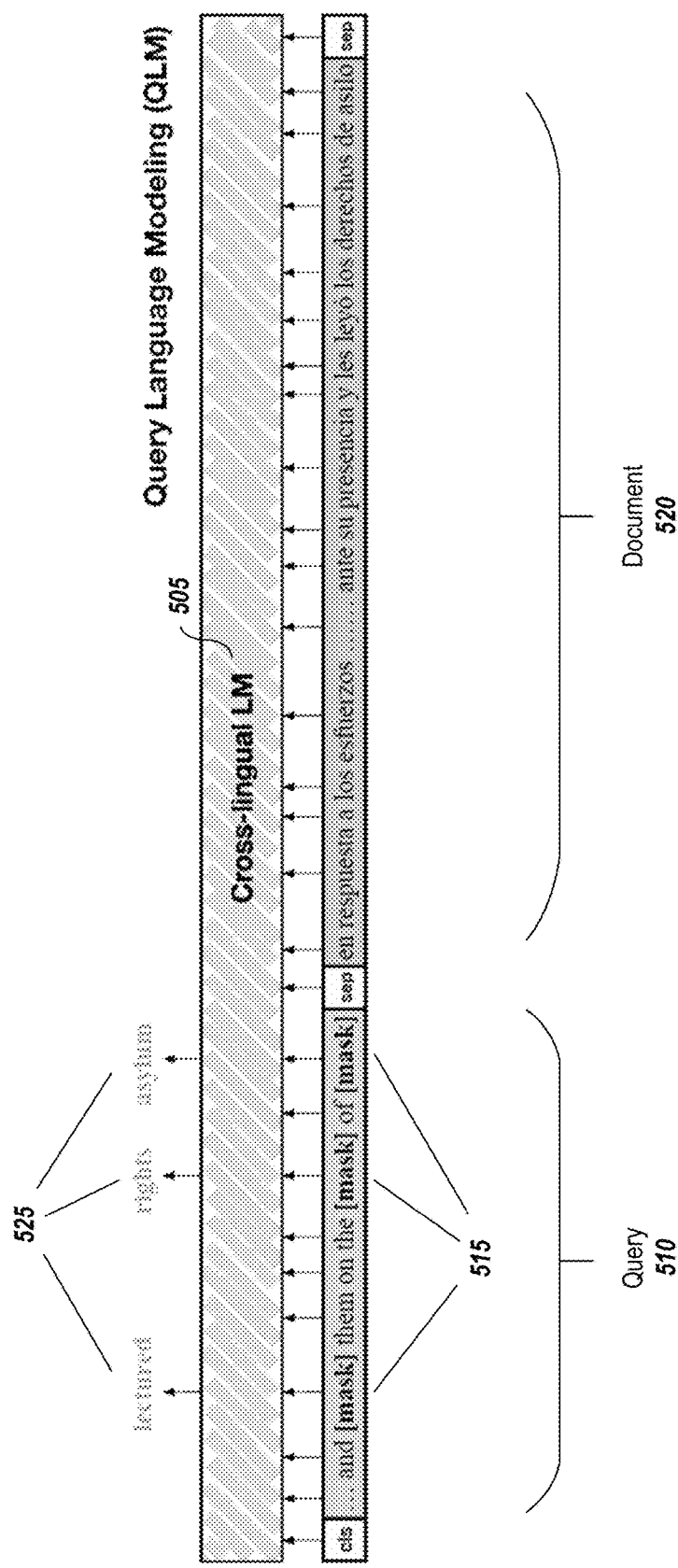
FIG. 5 depicts a cross-lingual retrieval-oriented pretraining query language modeling task system, according to embodiments of the present disclosure.
Figure 6:
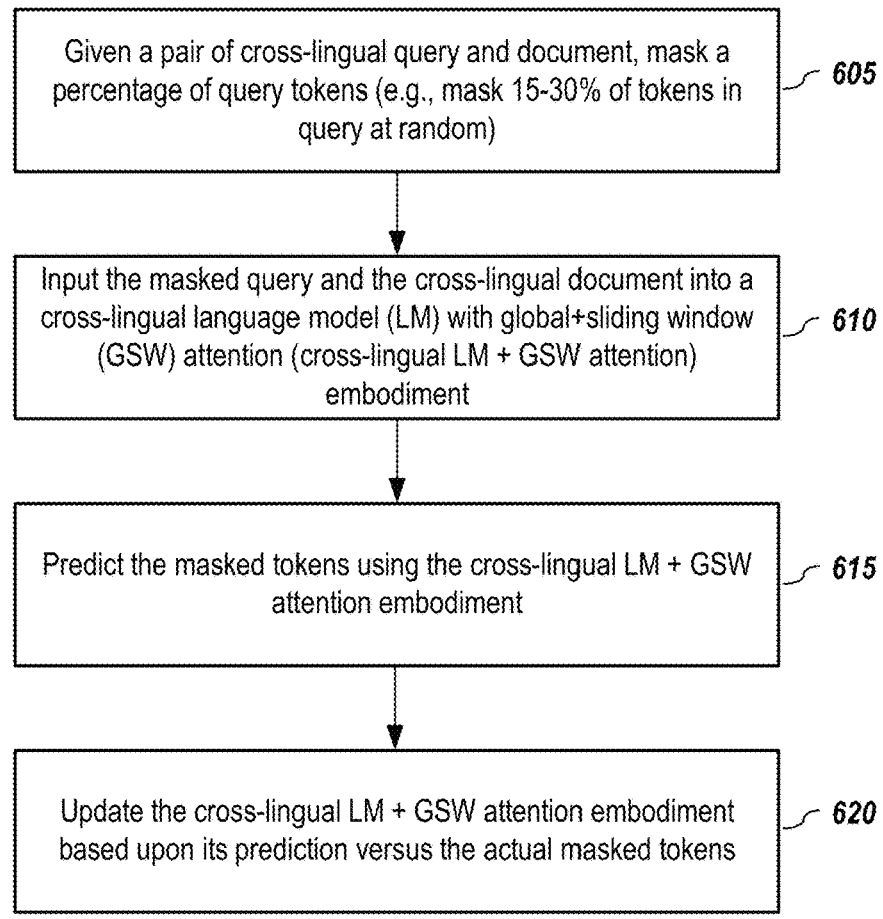
FIG. 6 depicts a method for pretraining a cross-lingual language model using a query language modeling task, according to embodiments of the present disclosure.

FIG. 5 graphically depicts a cross-lingual retrieval-oriented pretraining system with a query language modeling task, according to embodiments of the present disclosure. FIG. 6 depicts a method for pretraining a cross-lingual language model with global+sliding window attention using a query language modeling task, according to embodiments of the present disclosure. Given a pair of cross-lingual query 510 and document 520, a percentage of query tokens 515 are masked (605), which may be masked at random. The output from the CL LM+GSW attention model 505 is input (610) into a model head (not shown), which is used to output a prediction of those masked tokens (e.g., predicted words 525). For example, in one or more embodiments, the final hidden vectors corresponding to the mask query tokens are fed into an output softmax over the vocabulary to produce the final output words 525. In one or more embodiments, the cross-lingual LM+GSW attention model embodiment is updated or trained (620) based upon its prediction versus the actual masked tokens.

In one or more embodiments, if 15% of the query tokens are masked, QLM becomes easier than MLM, because there is an extra full foreign document to support predictions. To that end, in one or more embodiments, the masking probability may be increased up to at least 30% to enforce attention from query to foreign document. If document tokens were also masked, QLM reduces to approximate TLM. However, masking document tends not to promote cross-lingual attention, as the information from short foreign query is neglectable for helping complete long document. Therefore, in one or more embodiments, masking just query tokens with higher probability best promotes cross-lingual query-document interaction understanding. Justification for these choices is provided using empirical experiments as provided in § F.3.b, below.

b) Relevance Ranking (RR) Embodiments

Figure 7:
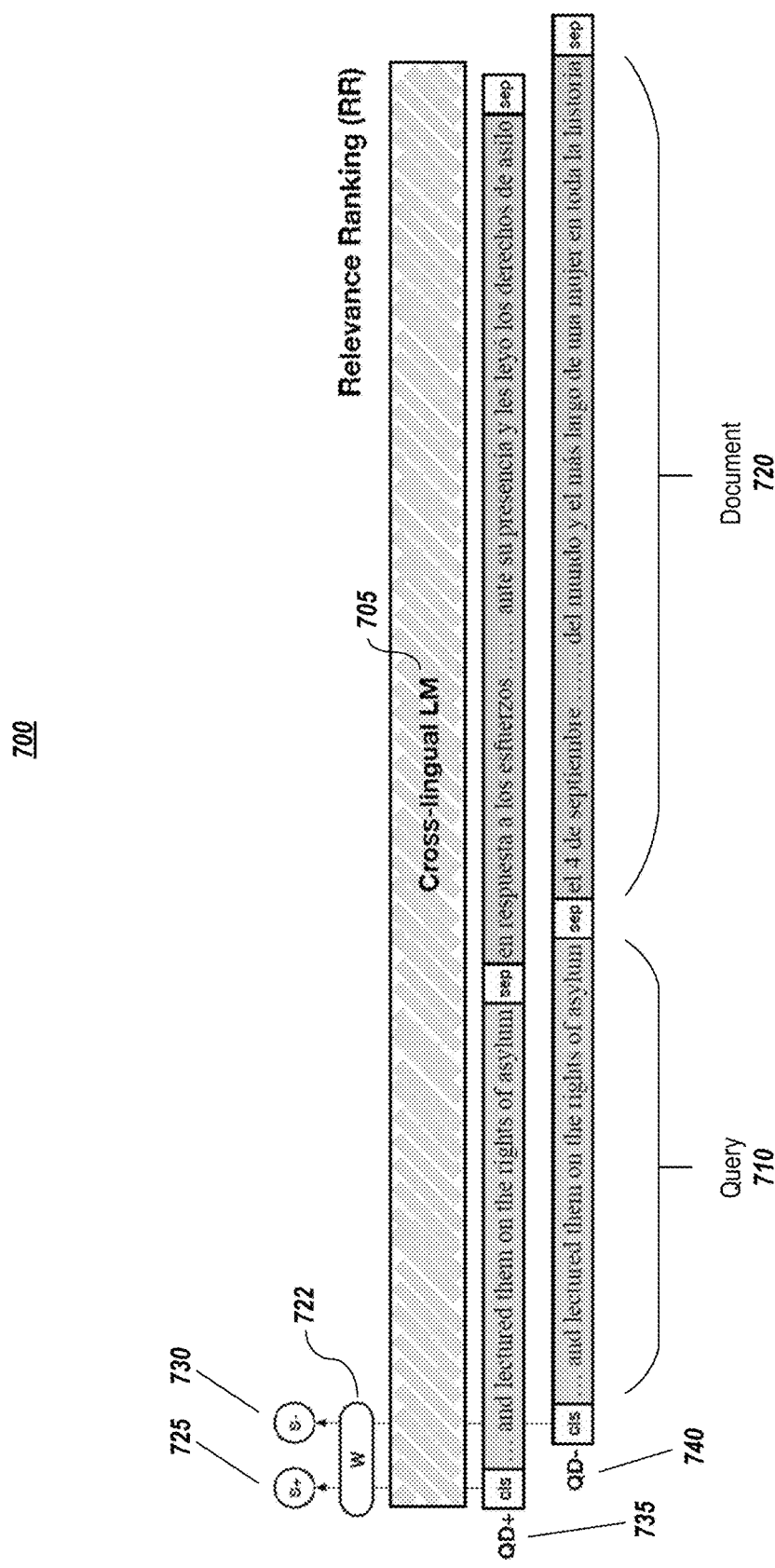
FIG. 7 graphically depicts a cross-lingual retrieval-oriented pretraining system with a relevance ranking task, according to embodiments of the present disclosure.

FIG. 7 graphically depicts a cross-lingual retrieval-oriented pretraining system with a relevance ranking task, according to embodiments of the present disclosure. One or more embodiments of this task may be considered to resemble a cross-lingual ad-hoc retrieval task, but there are significant differences. For example, the data has more coarse-grained semantics compared with finetuning data.

Given a pair of cross-lingual query 710 and document 720, the packed sequence QD$^+$ (e.g., sequence 735) is encoded with the model 705, and a model head (e.g., learnable weight matrix W 722) multiplies the output hidden vector of the [cls] token and yields a ranking score S$^+$ 725. An irrelevant document may also be sampled to form sequence QD$^-$ 740, and similarly acquire a ranking score S$^-$ 730. The model 705 may be optimized with cross-entropy loss, which supports multiple negative examples. In one or more embodiments, one negative example may be sampled per positive example, although different ratios may be used. Given query Q and document D, where Q E Sec$_s$(i)∈Page$_s$ and D=Sec$_t$(j)∈Page$_t$, then {Sec$_t$(k)}$_{k≠j}$ are considered hard negative examples. To avoid repeating the same negative document across training epochs when there are few sections in Page$_t$, the probability of sampling hard negative examples may be dynamically adjusted according to the source entity, from which the positive query-document pair is created. In one or more embodiments, the probability of sampling hard examples is set to $\alpha_T=1-(3/4)^T$, where T is the number of sections in Page$_t$. With probability 1−$\alpha_T$, a section in language L$_t$ may be randomly sampled as an irrelevant document.

Figure 8:
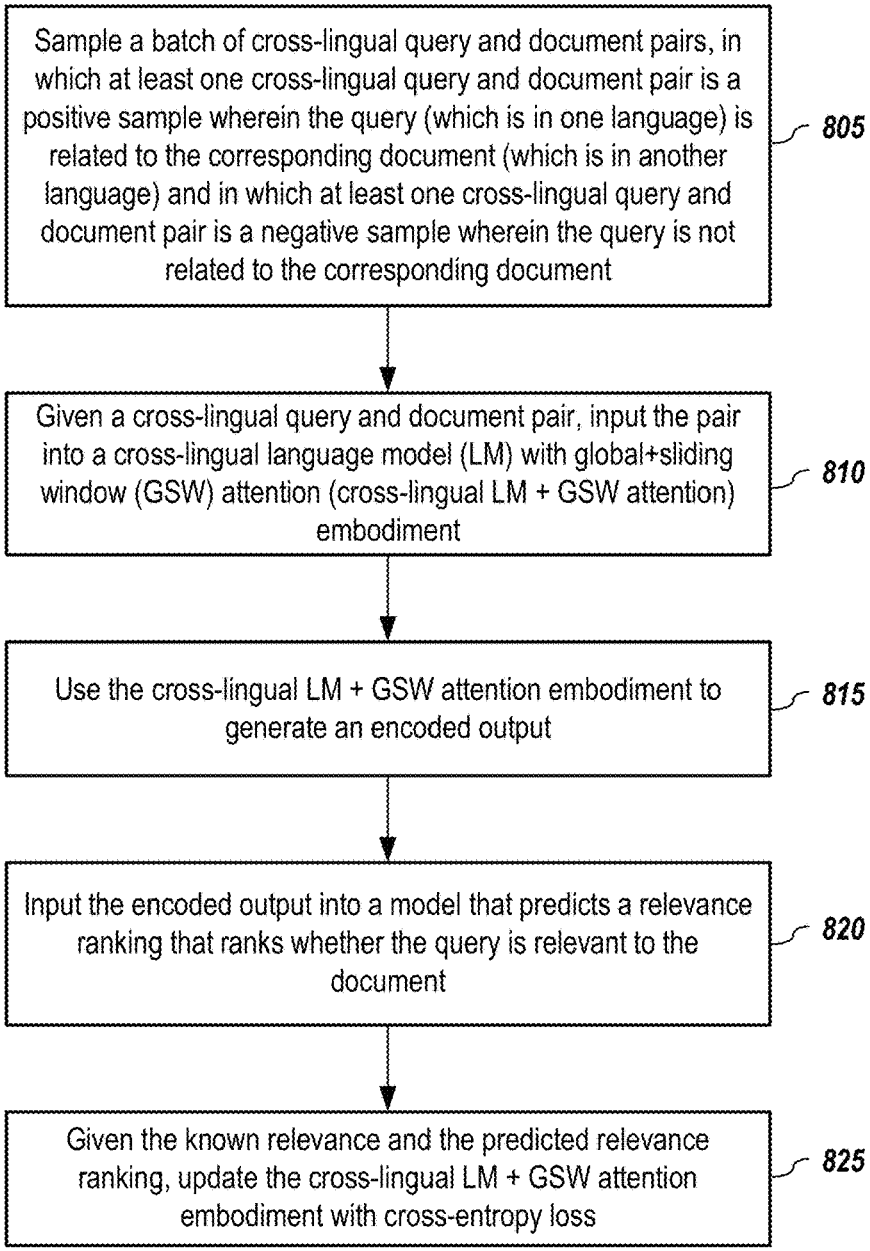
FIG. 8 depicts a method for pretraining a cross-lingual language model with global+sliding window attention using a relevance ranking task, according to embodiments of the present disclosure.

FIG. 8 depicts an alternative method for pretraining a cross-lingual language model with global+sliding window attention using a relevance ranking task, according to embodiments of the present disclosure. In one or more embodiments, a batch of cross-lingual query and document pairs are sampled (805), in which at least one cross-lingual query and document pair is a positive sample and at least one cross-lingual query and document pair is a negative sample. Because this is a cross-lingual pair, the query is in one language and the corresponding document is in another language. Positive samples mean that the query is related to the corresponding document in the pair, and a negative sample means that the query is not related to the corresponding document in the pair. Given a cross-lingual query and document pair, the pair is input (810) into a cross-lingual language model (LM) with global+sliding window (GSW) attention (cross-lingual LM+GSW attention) embodiment (e.g., model 705). The cross-lingual LM+GSW attention embodiment is used (815) to generate an encoded output, which is input (820) into a model (e.g., model (722) that predicts a relevance ranking (e.g., $S^+$ or $S^-$) that ranks whether the query is relevant to the document. Given the known relevance and the predicted relevance ranking, the cross-lingual LM+GSW attention embodiment may be updated (825) with a loss function, such as cross-entropy loss.

3. Pretraining Embodiments

Figure 9:
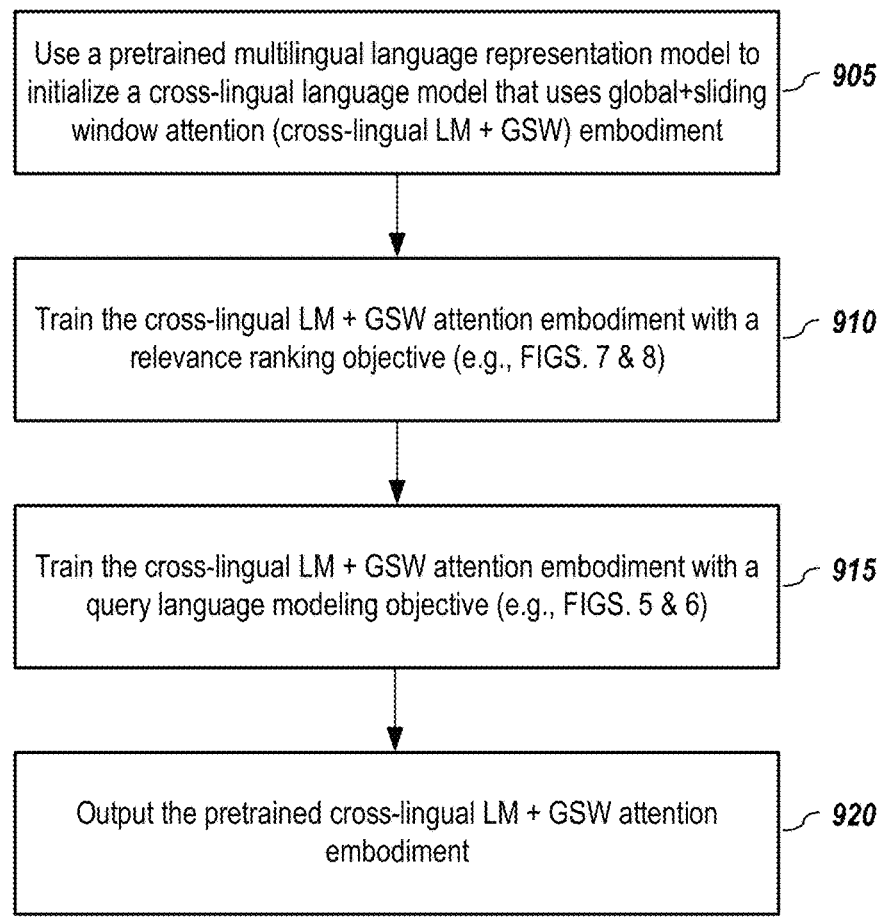
FIG. 9 depicts a method for pretraining a cross-lingual LM+GSW attention model, according to embodiments of the present disclosure.
Figure 10:
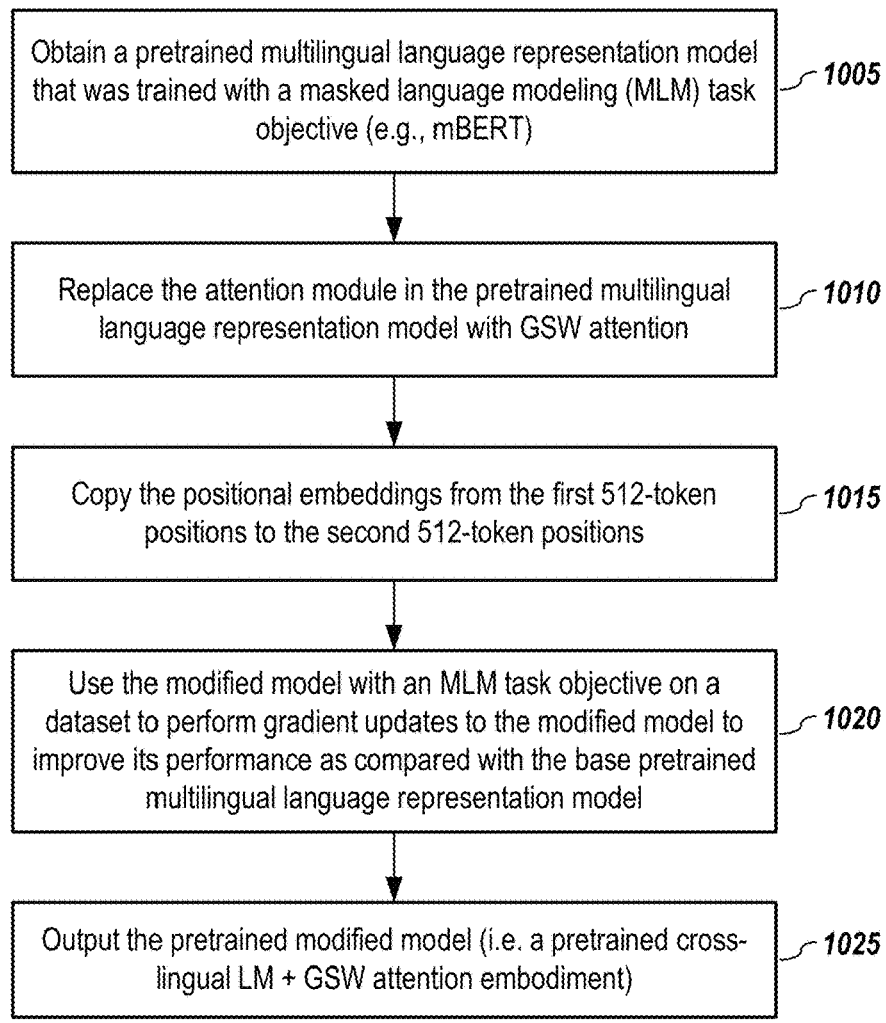
FIG. 10 depicts a method for converting a pretrained multilingual language representation model into a cross-lingual language model (LM) with global+sliding window (GSW) attention (cross-lingual LM+GSW attention) model, according to embodiments of the present disclosure.

FIG. 9 depicts a method for pretraining a cross-lingual LM+GSW attention model, according to embodiments of the present disclosure. Pretraining a language model from scratch incurs a high computational cost. In one or more embodiments, pretraining retrieval-oriented language model embodiments may start (905) with a pretrained language model. For example, the public mBERT checkpoint (available at huggingface.co/bert-base-multilingual-uncased), which has been pretrained on over 100 languages using an MLM objective, may be used as a starting point, although other language models may be used. Therefore, cross-lingual LM embodiments are implicitly pretrained with three objectives (MLM, QLM, and RR). FIG. 10, discussed below, presents method embodiments with additional details for initializing a cross-lingual language model with global+sliding window attention (cross-lingual LM+GSW) embodiment.

The following naming convention is used for identifying the different variants of model embodiments: "(model, objective, epochs)". A model with full self-attention is directly called mBERT, while the model with GSW attention is named mBERT-GSW. For example, (mBERT-GSW, QLM-RR, 10 epochs) is a cross-lingual LM+GSW attention model pretrained with both QLM and RR for 10 epochs.

When pretraining with both objectives, in one or more embodiments, training is done (910) with relevance ranking (RR) in random order of language pairs, then training is done (915) with query language modeling (QLM) in random order of language pairs in each iteration. In one or more embodiments, each epoch contained 32K positive query-document pairs per language pair for each objective. Embodiments were trained with 16 Nvidia VOLTA (16 GB) GPUs. Adam was used for model optimization. The learning rate was set to 1e-5 and batch size was set to 32. In one or more embodiments, a maximum of 20 epochs was set for training. Training mBERT took about 24 hours, and training mBERT-GSW (window size=64, max sequence length=1024) took about 40 hours.

FIG. 10 depicts a method for converting a pretrained multilingual language representation model into a cross-lingual language model (LM) with global+sliding window (GSW) attention (cross-lingual LM+GSW attention) model, according to embodiments of the present disclosure. Given (1005) an initial pretrained multilingual language representation model (e.g., mBERT), in one or more embodiments, an mBERT-GSW with 1024 tokens may be obtained by replacing (1010) the attention module in mBERT with GSW attention, and copying (1015) the positional embeddings from the first 512-token positions to the second 512-token positions as an initialization. A naïve mBERT-GSW may have worse language modeling ability (reflected in high bits-per-character (BPC) measure) due to the copied non-optimized positional embeddings. Accordingly, in one or more embodiments, the MLM task may be used on a dataset (e.g., a Wikitext-103 dataset) and perform 2K gradient updates (1020) such that mBERT-GSW has similar BPC compared with base mBERT. Once training is done, the pretrained modified model (i.e., a pretrained cross-lingual LM+GSW attention embodiment) is output. In one or more embodiments, the output pretrained cross-lingual LM+GSW attention embodiment may then be used in training with RR and QLM tasks as discussed above.

Figure 11:
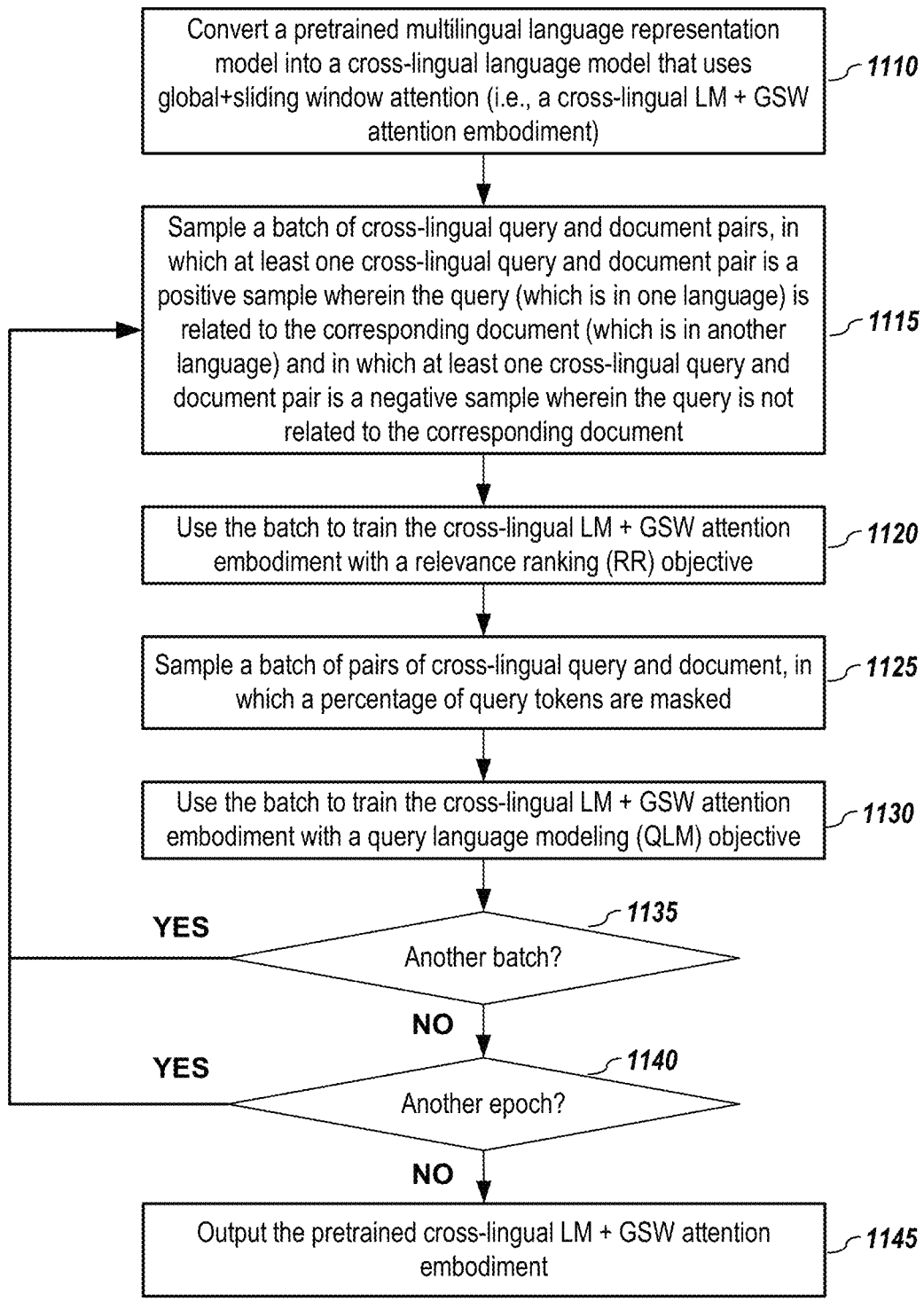
FIG. 11 depicts an alternative method for pretraining a cross-lingual LM+GSW attention model, according to embodiments of the present disclosure.

FIG. 11 depicts an alternative method for pretraining a cross-lingual LM+GSW attention model, according to embodiments of the present disclosure. In one or more embodiments, a pretrained multilingual language representation model is converted (1110) into a cross-lingual language model that uses global+sliding window attention (i.e., a cross-lingual LM+GSW attention embodiment). FIG. 10, for example, depicts an example method for performing this conversion.

In one or more embodiments, a batch of cross-lingual query and document pairs are sampled (1115), in which at least one cross-lingual query and document pair is a positive sample (i.e., related to the corresponding document (which is in another language)) and at least one cross-lingual query and document pair is a negative sample (i.e., not related to the corresponding document). The batch is used to train (1120) the cross-lingual LM+GSW attention embodiment with a relevance ranking (RR) objective/task.

In one or more embodiments, a batch of pairs of cross-lingual query and document, in which a percentage of query tokens are masked, is also sampled (1125). It shall be noted that the positive samples in the batch from the RR training may be used for this batch. Other data from the prior sample may also be used (e.g., use the query but identify the correct corresponding documents). The batch is used to train (1130) the cross-lingual LM+GSW attention embodiment with a query language modeling (QLM) objective/task. In one or more embodiments, a loss function, such as cross-entropy loss may be used in the training.

In one or more embodiments, another batch may be obtained (1135) and the process returns to step 1115. Alternatively, if there are no additional batches for this epoch, a query is made (1140) whether another epoch should be started. If another epoch commences, the process returns to step 1115; otherwise, the pretrained cross-lingual LM+GSW attention embodiment is output (1145). The outputted pretrained cross-lingual LM+GSW attention embodiment may then be finetuned for specific tasks such as CLIR or CLQA.

E. Finetuning CL Application Models Using a Pretrained Cross-lingual LM+GSW Attention Model Embodiment As noted above, a pretrained cross-lingual language model with global+sliding window attention (cross-lingual LM+GSW attention) model embodiment may be used in various cross-lingual applications. By way of example, cross-lingual information retrieval and cross-lingual question answering model embodiments are presented in this section.

1. CLIR Model Embodiments

Figure 12:
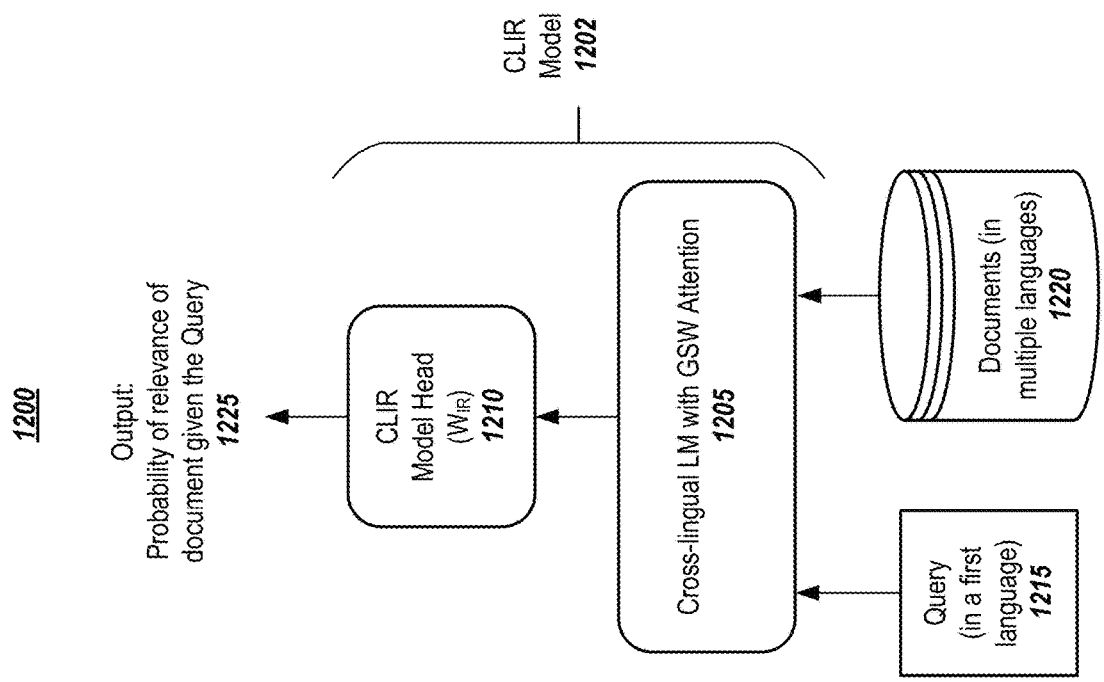
FIG. 12 graphically illustrates a cross-lingual information retrieval (CLIR) system, according to embodiments of the present disclosure.

FIG. 12 depicts a cross-lingual information retrieval (CLIR) system, according to embodiments of the present disclosure. As illustrated in FIG. 12, the model embodiment 1202 comprises a CLIR model head 1210 that receives input from a CL LM+GSW attention model embodiment 1205. The CL LM+GSW attention model embodiment 1205 receives a query input 1215 along with documents 1220. The goal of the model 1202 is to identify the relevant document(s), if any, given the input query 1215. The CLIR task may be considered to resemble a cross-lingual relevance ranking task. Accordingly, one skilled in the art shall recognize that aspects of training as discussed above with respect to FIGS. 7 and 8 may be applied here.

FIG. 13 depicts a method for finetuning/training a cross-lingual information retrieval (CLIR) system that uses a pretrained cross-lingual language model (LM) with global+sliding window (GSW) attention (cross-lingual LM+GSW attention) model, according to embodiments of the present disclosure. Given a CLIR model 1202 comprising a pretrained cross-lingual LM+GSW attention model embodiment 1205 and a CLIR model head 1210, the parameters/weights of the CLIR model head 1210 may be initialized (1305) with either random values, the model weights from the RR model head used in pretraining (as a warm start), or a combination thereof.

Having initialized the model, the overall CLIR model may be trained (1310) using query-document pairs (e.g., positive and negative samples) to finetune the CL LM+GSW model 1205 and to train the CLIR model head 1210. For example, given a pair of cross-lingual query and document, the query-document sequence may be encoded with the model 1205, and the model head 1210 multiplies the output hidden vector of the [cls] token to yield a relevance score. Updating may be performed using cross-entropy loss and training may continue until a stop condition is reached. Once a stop condition is reached, the trained CLIR model 1202 is output and may be used for CLIR tasks. In one or more embodiments, the CLIR model may set a threshold for relevance and output the top relevant documents, which may be listed by order of scored relevance.

2. CLQA Model Embodiments

Figure 14:
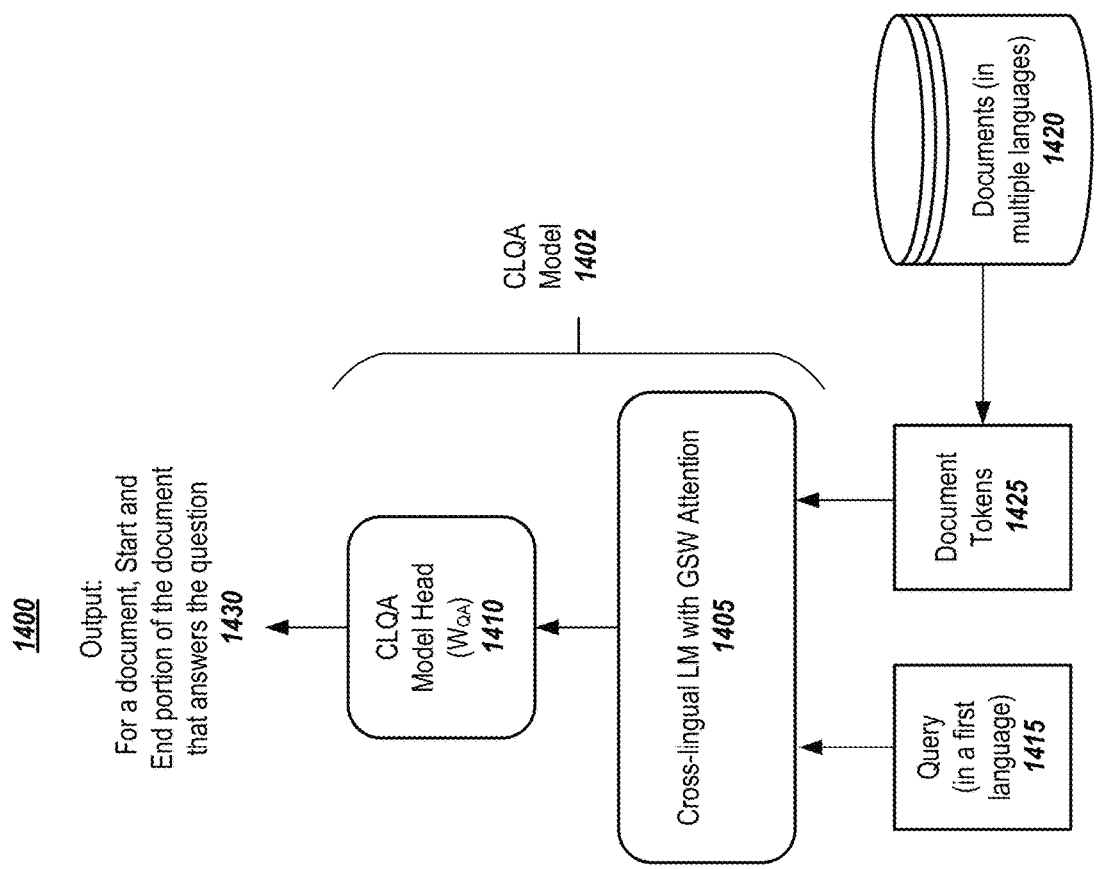
FIG. 14 depicts a cross-lingual question-answer (CLQA) system, according to embodiments of the present disclosure.

FIG. 14 depicts a cross-lingual question-answer (CLQA) system, according to embodiments of the present disclosure. As illustrated in FIG. 14, the model embodiment 1402 comprises a CLQA model head 1410 that receives input from a CL LM+GSW attention model embodiment 1405. The CL LM+GSW attention model embodiment 1405 receives a question input 1415 along with document tokens 1425 for each document from a set of documents 1420. The goal of the model 1402 is to identify the relevant portion (start and end tokens) of the relevant document(s), if any. In one or more embodiments, the CLQA model head may comprise two feedforward neural networks (which each may comprise one or more layers), in which one feedforward neural network takes the output from the cross-lingual language model and predicts a start token in the document and the other feedforward neural network takes the output from the cross-lingual language model and predicts the end token in the document.

Figure 15:
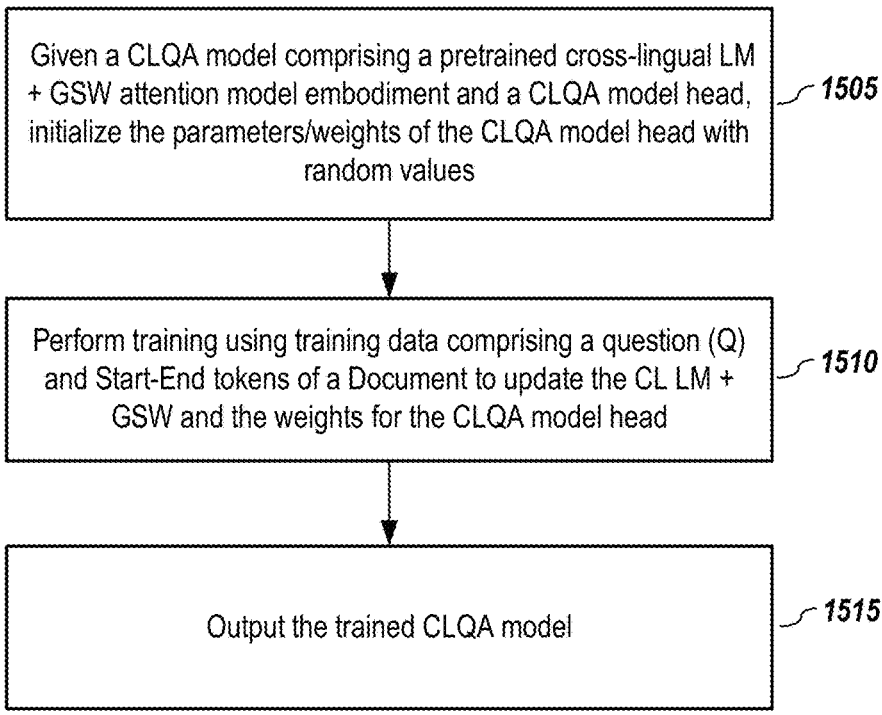
FIG. 15 depicts a method for finetuning/training a cross-lingual question-answer (CLQA) system that uses a pretrained cross-lingual language model (LM) with global+sliding window (GSW) attention (cross-lingual LM+GSW attention) model, according to embodiments of the present disclosure.

FIG. 15 depicts a method for finetuning/training a cross-lingual question-answer (CLQA) system that uses a pretrained cross-lingual language model (LM) with global+sliding window (GSW) attention (cross-lingual LM+GSW attention) model, according to embodiments of the present disclosure. Given a CLQA model 1402 comprising a pretrained cross-lingual LM+GSW attention model embodiment 1405 and a CLQA model head 1410, the parameters/weights of the CLQA model head 1410 may be initialized (1505) with random values. Having initialized the model, the CLQA model may be trained (1510) using training data comprising an input question and corresponding start-end tokens of a document that answers the input question. In one or more embodiments, an error may be determined, in which the error represents a sum of the error in identifying the start token plus the error in identifying the end token in the document. Updating may be performed using cross-entropy loss, and training may continue until a stop condition is reached. Once a stop condition is reached, the trained CLQA model 1402 is output and may be used for QA tasks.

F. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

1. Cross-lingual Ad-hoc Retrieval a) Evaluation Data and Metric

The gold standard CUR dataset CLEF was selected for evaluating cross-lingual ad-hoc retrieval effectiveness. Collections for ad-hoc retrieval were used. In the dataset, two hundred topics in different languages are regarded as queries for retrieving news articles in different languages. Four languages in our pretraining data were selected and thus form twelve cross-lingual query-document evaluation pairs. Following standard practice, queries were created by concatenating the title and the description of each topic. Queries without any relevant document were removed. A first-stage retrieval model like BM25 was not employed to get top candidates for re-ranking, for that such a method would require a query translation module and thus might introduce bias. Since human evaluators were presented with top-ranked documents when creating the relevance labels, we directly use all labelled documents with respect to a query as re-ranking candidates. Mean-average-precision (MAP) on query level is reported. Statistically significant differences in MAP were determined using the two-tailed paired t-test with $p<0.05$. The statistics of the CLEF dataset are shown in TABLE 3.

TABLE 3

Statistics of CLEF: number of queries (#query), average number of relevant (#pos) and irrelevant (#neg) documents per query, and average number of document tokens after mBERT tokenization (doc. length) for each language.

|    | #query | #pos | #neg  | doc. length |
|----|--------|------|-------|-------------|
| En | 176    | 18.5 | 404.0 | 699.2       |
| Es | 156    | 50.7 | 319.5 | 490.2       |
| Fr | 185    | 22.0 | 267.3 | 454.3       |
| De | 192    | 25.0 | 324.3 | 448.7       | b) Competing Methods

Model embodiments were compared with several recent competitive CLIR methods.

(i) BWE-AGG. It is an unsupervised approach that first builds query and document embeddings by summing the CLE of their constituent terms (see Robert Litschko, Goran Glavas, Simone Paolo Ponzetto, and Ivan Vulic. 2018. Unsupervised Cross-Lingual Information Retrieval Using Monolingual Data Only. In *Proceedings of the 41st International ACM SIGIR Conference on Research & Development in Information Retrieval (SIGIR)*. Ann Arbor, MI, 1253-1256.) (hereinafter, "Litschko et al. (2018)"). Candidate documents are ranked by the cosine similarity of their embeddings with the query embeddings. There are two variants based on different summing weights for constructing document embedding: BWE-AGG-ADD uses uniform weight for all terms, and BWE-ADD-IDF weights document terms with IDF in the target language collection. fastText embeddings were used.

(ii) TbT-QT-QL. It is an unsupervised query translation approach based on CLE. (see Litschko et al. (2018)). Each source language query term was translated to its nearest target language term in the CLE space. The CLIR task was thus reduced to a monolingual retrieval task, and the translated queries were used with a query likelihood model. Galago (lemurproject.org/galago.php) was used for building inverted indexes and retrieving documents. fastText embeddings were used for query translation.

(iii) DRMM and K-NRM. The two matching models from an earlier study on neural CLIR were selected (see Puxuan Yu and James Allan. 2020. A Study of Neural Matching Models for Cross-lingual IR. In *Proceedings of the 43rd International ACM SIGIR conference on research and development in Information Retrieval (SIGIR)*. Virtual Event, China, 1637-1640.) (hereinafter, "Yu et al. (2020)"). They built term-level query-document interactions from CLE, but used different pooling methods to output matching scores. The two models were implemented based on Matchzoo (see Jiafeng Guo, Yixing Fan, Xiang Ji, and Xueqi Cheng. 2019. MatchZoo: A Learning, Practicing, and Developing System for Neural Text Matching. In *Proceedings of the 42nd International ACM SIGIR Conference on Research and Development in Information Retrieval (SIGIR)*. Paris, France, 1297-1300.) (hereinafter, "Guo et al (2019)"). For CLE, fastText embeddings and smart-shuffling bilingual word embeddings were tested. The former is an example of post-projection CLEs and aligns fastText embeddings trained on monolingual Wikipedias in 44 languages into one space using the relaxed CSLS method. Smart-shuffling is a pseudo-bilingual method, but instead of randomly shuffling words in parallel sentences, it also leverages word-level parallel data (i.e., translation dictionaries) to guide the process in order to bridge the "translation gap". Smart-shuffling embeddings with window size set to 10 were used. Note that the smart-shuffling embeddings are bilingual, and only overlap with the evaluation languages on {En&Fr, En&De}. Therefore, its performance on four query-document language pairs is reported herein.

(iv) mBERT. The public checkpoint of multilingual BERT (huggingface.co/bert-base-multilingual-uncased) was used. It was originally pretrained with the masked language modeling (MLM) and next sentence prediction (NSP) objectives on the top 102 languages with the largest Wikipedia dumps.

(v) XLM-R. The public checkpoint (huggingface.co/xlm-roberta-base) was used.

It was originally pretrained with the MLM objective on the CommonCrawl corpus in 100 languages.

c) Evaluation Details

As mentioned earlier, all labelled query-document pairs were used on CLEF as hard candidates, and re-ranking MAP is reported. For unsupervised methods, testing was on all queries. For methods that require training, five-fold cross validation was adopted to overcome the small number of queries per language pair. Evaluation was performed separately in terms of language pairs. Specifically, each training (finetuning) epoch contained all positive query-document pairs. Each positive document was paired with one randomly sampled hard negative document, and optimization with pairwise cross-entropy loss was performed. The maximum number of training (finetuning) epochs was set to 20. MAP on test set when the model yields the best MAP on valid set was recorded. For DRMM, bin size was set to 30, and histogram mode was set to "log-count." For KNRM, the number of Gaussian kernels was set to 20 (plus another one for exact matching), and a to 0.1. For finetuning Transformer-based models (mBERT, XLM, and embodiments of the current patent document), only the last three encoder layers were finetuned to avoid overfitting. Also, before finetuning, the parameters of the last three encoder layers were re-initialized ("reset") for better stability.

d) Results

The overall results of all competing CLIR models on all evaluation language pairs are summarized in TABLE 4, which is in FIG. 16. A detailed analysis is provided below.

TABLE 4 (FIG. 16) depicts results of CLIR performance on CLEF. Numbers are MAP. Best performance on each language pair is marked bold. "*" indicates statistically significant improvement over mBERT (paired t-test, $p<0.05$).

Unsupervised approaches: BWE-AGG and TbT-QT-QL were unsupervised CLIR methods based on fastText CLE. In most cases, TbT-QT-QL was better than BWE-AGG by a large margin, which is consistent with findings reported in prior research. However, these two studies only perform experiments where English is the query language, while experiments herein were more comprehensive. It was found that on some occasions ({De-Es, De-Fr, Es-De, Fr-De}), BWE-AGG performed closely or even slightly better than TbT-QTQL. The latter heavily relies on the quality of top-1 term translation. It was suspected that the German embeddings were not aligned well with Spanish/French embeddings in a way that provided quality top-1 nearest-neighbor term translation.

Neural matching: DRMM and KNRM represent the category of neural matching. A big drop was seen from the numbers reported in Yu et al. (2020). One main difference between their evaluation and the evaluation herein was that they truncate documents to the first 500 terms, while tests herein kept everything. Similar performance was observed with their report if the same truncation strategy was employed: neural matching performed significantly better than unsupervised methods, but still worse than mBERT baseline in this patent document. This suggests that KNRM and DRMM cannot handle long documents very well. The first direct empirical comparison of smart-shuffling embeddings and fastText embeddings for retrieval is presented herein. It was observed that smart-shuffling has smaller vocabulary coverage in the CLEF collection, which can be a significant factor in its inferior performance.

General language models: This category includes XLM-R, mBERT, and mBERT-GSW embodiments. XLM-R's bad performance was consistent with others' findings. It appears that the results herein were the first to report decent performance of mBERT on CLIR. It seems counter-intuitive that XLM-R performs much worse than mBERT: they have a similar model structure and pretraining objective (MLM), but XLM-R was trained with more data and was reported to outperform mBERT on various cross-lingual tasks. Controlled experiments were conducted to exclude tokenizers and text casing as factors. It is suspected that the failure of XLM-R for CLIR was due to the way pretraining data was fed to the model: unlike BERT, XLM-R takes in streams of tokens such that a sequence in a mini-batch can contain more than two consecutive sentences. This may work well for word-level tasks like extractive QA (shown in § F.2), but could cause confusion for tasks like CLIR which require representation alignment of long texts. Comparing mBERT and mBERT-GSW embodiment, statistically significant improvement of the latter upon the former was observed in most circumstances. This indicates that the benefit of accepting a longer input sequence is not limited to the pretraining phase, but also at the finetuning and inference phase. Less information loss during finetuning can lead to significant differences at inference time.

Retrieval-oriented language models: This category describes cross-lingual LMs pretrained with QLM and RR objectives. By comparing (mBERT, QLM-RR) to base mBERT, significant improvement on re-ranking effectiveness on all language pairs can be seen. This proves that (i) the pretraining objectives embodiments are effective for downstream CLIR task; and (ii) the pretraining weak-supervision data constructed with section alignment from multi-lingual Wiki is of high quality and the learned knowledge is generalizable to non-Wiki collections. By comparing retrieval-oriented LMs with GSW attention (mBERT-GSW embodiment, QLM-RR) to ones with self-attention (mBERT, QLM-RR), additional statistically significant improvement was observed. It indicates that natively expanding Transformers's input length to encode more document content can provide further benefits for ad-hoc retrieval, which are additional to the benefits of retrieval-oriented pretraining. A full model embodiment (mBERT-GSW, QLM-RR, 20) provided up to 29.7% MAP improvement on vanilla mBERT re-ranker.

2. Cross-lingual Question Answering

Cross-lingual extractive question answering is a word-level retrieval task, and it does not have an explicit connection with either of our pretraining objectives. Therefore, it can better demonstrate the ability of generalization of our proposed language model pretraining strategies.

a) Evaluation Datasets

A multi-lingual question answering (MLQA) dataset was selected for testing. There was no dedicated training data in the dataset, and following standard practice, finetuning with a second MLQA training dataset, and the dev and test sets in the first MLQA dataset were used for evaluation under two settings. (i) zero-shot XLT: dev/test sets were monolingual QA in a language different from finetuning language; and (ii) GXLT: question and context/answer in dev/test sets were in different languages. Note that G-XLT may not be zero-shot in terms of language because either query or context language might be English. As there was no French data in the MLQA dataset, the tests ended up with six language pairs for G-XLT and two languages (Spanish and German) for XLT. F1 score and exact-match score were measures, which are standard metrics for extractive QA. The MLQA datasets are much larger than CLEF, so finetune all encoder layers of language models was able to be performed. Results on test set when the model yielded best F1 score on dev set is reported. Statistical significance tests were conducted using two-tailed paired t-test with p<0.05.

b) Results

The overall results of cross-lingual question answering using the MLQA dataset from the prior section are summarized in TABLE 5 (FIG. 17). Comparing general language models, XLM-R performed slightly better than mBERT under XLT setting, but much worse under G-XLT setting. The tested mBERT-GSW embodiment performed slightly better than mBERT.

The tested language model embodiments pretrained with QLM and RR yielded statistically significant improvement over mBERT when fully trained, and the improvement was more significant on G-XLT than XLT. This may be because the models were strictly pretrained with only bilingual query-document pairs. In other words, XLT was a zero-shot task with respect to our pretraining data, and it is more difficult to improve on.

Cross-task comparisons (Table 4 (FIG. 16) and Table 5 (FIG. 17)) were also performed, and it was observed that when pretrained with the same objectives for the same number of epochs, mBERT-GSW embodiments consistently perform better than mBERT on CLIR, but two models perform similarly for QA. Documents ("contexts") in the MLQA datasets are paragraphs and are in general shorter than news articles in CLEF. Therefore, pretraining on longer texts did not appear to provide additional gains for QA, as finetuning and testing data have smaller sequence length.

3. Ablation Studies and Parameter Analysis a) Utilities of Pretraining Tasks

Experiments were conducted to investigate the effect of each pretraining objective on downstream tasks. For efficiency, language models that limit input sequences to the first 512 tokens (with self-attention) were used instead of those that limit inputs to 1024 tokens (with GSW attention). Two more model embodiments were pretrained, one with only QLM objective, and one with only an RR objective. All compared models' performance in each available evaluation language pair in both CLIR and CLQA tasks was recorded. Significant differences in the patterns were not shown across language pairs, so two language pairs per task were selected for demonstration. The results are shown in FIG. 18.

Figure 18:
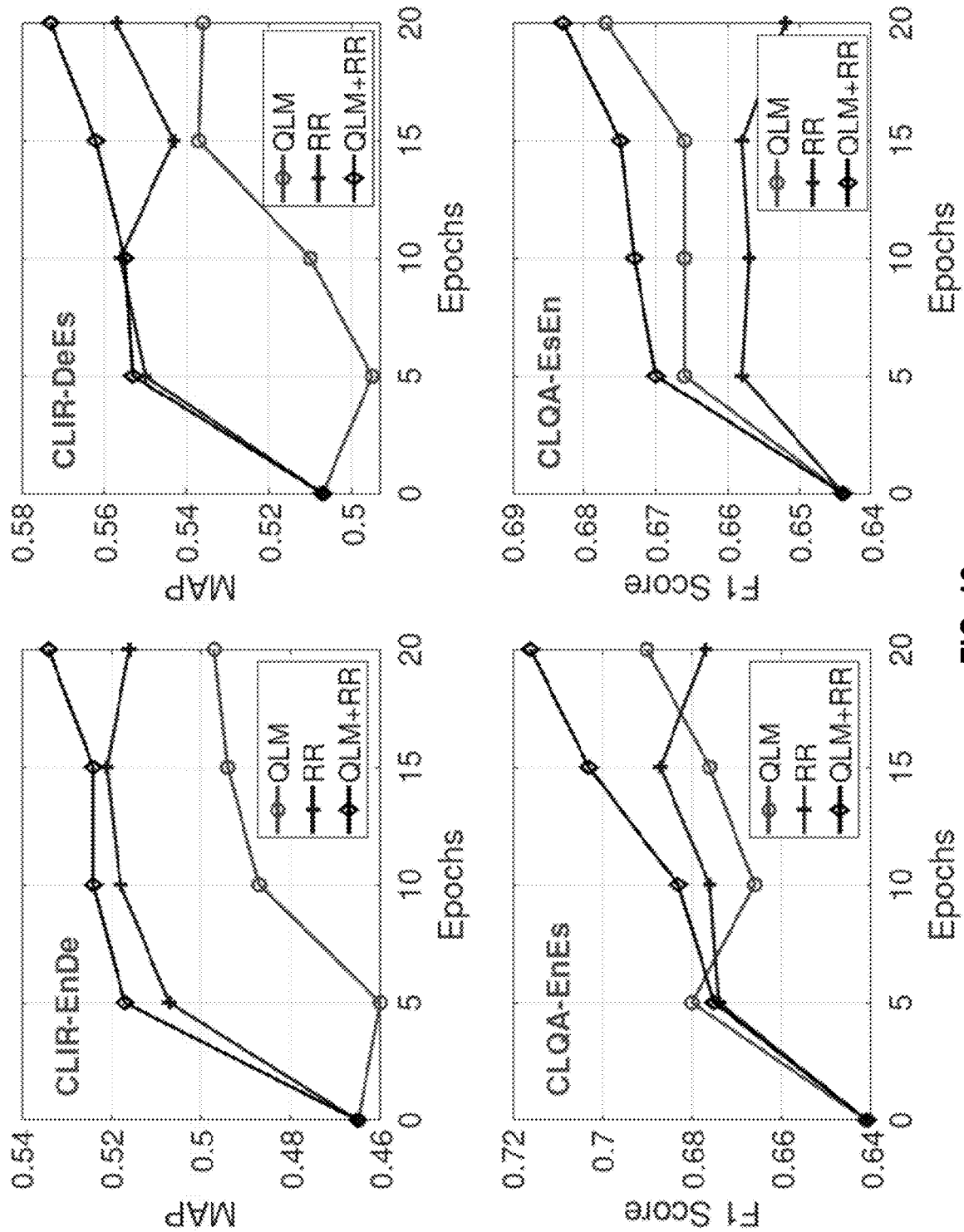
FIG. 18 depicts CLIR and CLQA performance of models pretrained with different objectives (QLM, RR, QLM+RR), according to embodiments of the present disclosure.

FIG. 18 depicts CLIR and CLQA performance of models pretrained with different objectives (QLM, RR, QLM+RR), according to embodiments of the present disclosure. The same evaluation strategies were used and performances at different pretraining epochs are reported. Note that the starting points (pretrained epochs=0) in all subfigures refer to the base mBERT model without RR or QLM pretraining.

In the case of CLIR, both RR and QLM provide positive gains for retrieval, while the former is much more effective than the latter. This is not surprising considering that RR takes the same form as ad-hoc retrieval using language models. It is observed that there exists a mutual complement between these two objectives, as QLM+RR performs significantly better than either alone. For CLQA, again both RR and QLM provide benefits towards this downstream task. However, QLM is more effective compared to RR in this case. The two pretraining objectives are also reciprocal as the LMs pretrained with both objectives perform the best in terms of F1.

Thus, it can be seen that QLM and RR have positive influence on downstream cross-lingual retrieval tasks individually, and those positive effects are also additive such that language models pretrained with both tasks give the best performance.

b) QLM Masking

Figure 19:
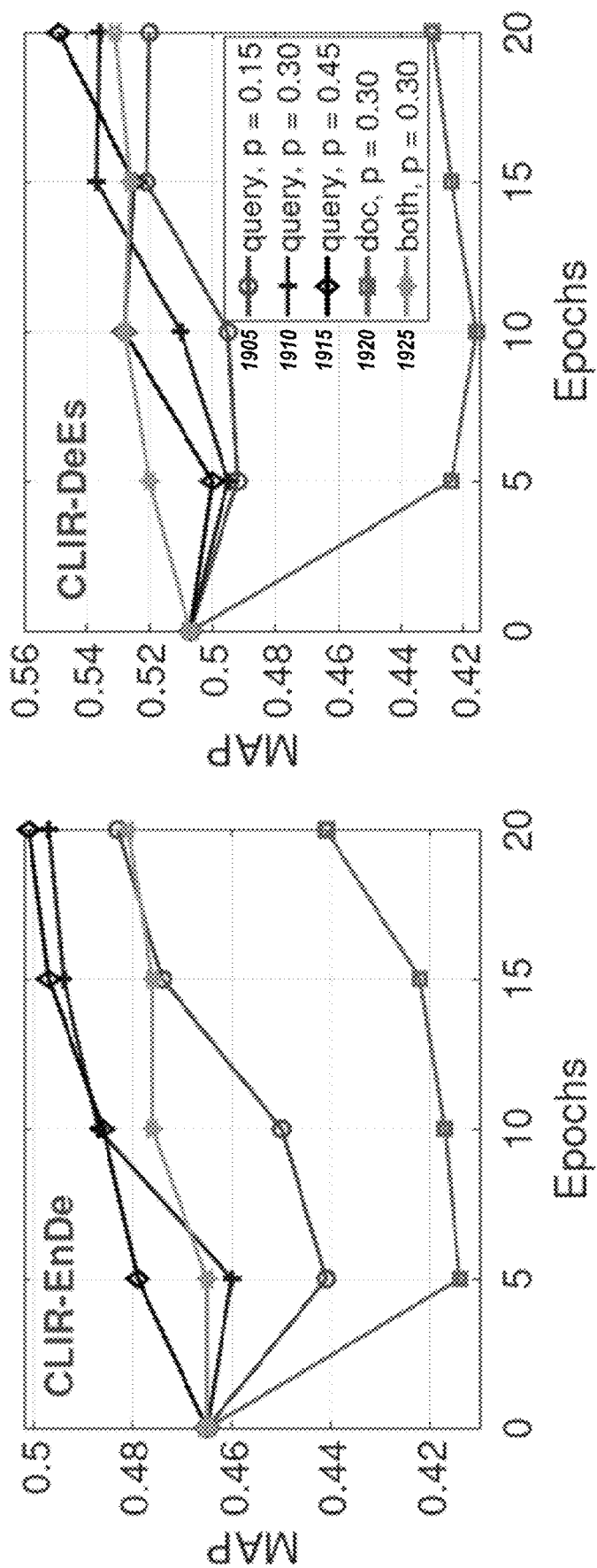
FIG. 19 depicts CLIR performance of model embodiments pretrained with QLM objective under different parameters (masking region, masking probability), according to embodiments of the present disclosure. Epochs=0 refers to base mBERT.

Two choices distinguish QLM from other pretraining tasks: (i) only query tokens were masked; and (ii) the probability of masking was increased from 15% to 30%. Here, controlled experiments were conducted to justify these choices. Five model embodiments were pretrained with only a QLM objective under different settings. Masking query with 30% probability was regarded as a baseline. Two model embodiments were trained with different query masking probabilities (15% and 45%). The other two model embodiments were trained with a masking probability of 30% but different regions (documents and query+document) were masked. Their performances on CLEF are reported in FIG. 19.

Masking probability: Comparing circle 1905, line 1910, and diamond 1915 plots, it can be observed that p=0.15 is consistently out-performed by higher query masking probability. This indicates that p=0.15 makes the QLM task too easy for the language model to learn cross-lingual query document interactions. Query masking probability p=0.45 performs slights better than p=0.30 when the model is well trained, suggesting that further increasing query masking probability can provide additional gains.

Masking region: Comparing line 1910, box 1920, and star 1925 plots, it appears that masking just document tokens greatly hurts CUR performance at the beginning of pretraining, and cannot recover to the level of vanilla mBERT re-ranker after 20 epochs of pretraining. Masking just query and masking both query and document can spark improvement, but the former performs significantly better when the model is well trained.

Thus, it is shown that masking only query tokens with higher probability (>0.3) is the better setting for the QLM task in one or more embodiments.

c) Semantic Alignment on Sentence and Document Level

In order to investigate if the proposed cross-lingual retrieval-oriented modeling tasks embodiments can promote cross-lingual alignment on more coarse-grained semantics, pretrained LMs were evaluated on two cross-lingual alignment tasks, namely, cross-lingual sentence alignment (XSA) and cross-lingual document alignment (XDA). XSA/XDA requires that parallel sentences/documents should have embeddings that are proximate in the representation space. A sentence (document) was encoded with the LM as "[cls] Content [sep]", and the [cls] token's last hidden state was taken as the sentence (document) embedding.

Metric. Given a set of sentences $\mathcal{S}$ and a set of corresponding parallel (translation) sentences $\mathcal{T}$, precision at top-1 (P@1) was measured, which is defined as:

$$P@1 = \frac{1}{|\mathcal{S}|} \sum_{s_i \in \mathcal{S}} \mathbb{1}\left(\left(\underset{j, t_j \in \mathcal{T}}{\mathrm{argmax}} Sim(s_i, t_j)\right) = i\right), \quad (2)$$

where $\mathbb{1}$ is the indicator function, and Sim is a function that measures the similarity of two cross-lingual sentences. The CSLS measure with neighborhood size set to 10 was used as the Sim function, which is a modified version of the cosine similarity measure. CSLS is widely adopted for evaluating cross-lingual word alignment for two advantages over cosine similarity: (i) CSLS is a symmetric measurement, meaning that switching $\mathcal{S}$ and $\mathcal{T}$ in evaluation does not affect the degree of alignment; and (ii) CSLS can mitigate the hubness problem.

Data. Evaluating XSA and XDA uses parallel sentences and documents. For XSA, a cross-lingual natural language inference (XNLI) dataset was used. It contains 10K sentences that are manually translated into 15 languages. The four languages that overlap with the pretraining languages herein were selected and six evaluation pairs were formed. For XDA, another dataset was used, which contains approximately 86,000 documents in six languages. Out of the four languages in the pretraining languages used herein, German was not in the corpus. Therefore, English, French, and Spanish data was used and three language pairs were formed. Same as in Sections F.3.a and F.3.b, LMs with input limited to 512 tokens were used for efficiency.

Results. Reported in TABLE 6 and TABLE 7 are the XSA and XDA performance of base mBERT, as well as cross-lingual LMs embodiments that have been additionally pre-trained with our retrieval-oriented modeling tasks for 20 epochs. One can observe that base mBERT generates poor cross-lingual sentence and document alignment, except between Spanish and French documents. In terms of XSA, QLM and RR bring improvement upon base mBERT. The improvement is more prominent with QLM, and that the effect is not additive on XSA. In terms of XDA, QLM and RR work similarly well, and combining two modeling tasks together can spark further improvement on cross-lingual document alignment. The differences between XSA and XDA are understandable considering that QLM is more focused on sentence-level semantics (sentence completion given foreign document) and that RR is more focused on document-level (ranking documents with respect to foreign sentence). In all circumstances, pretraining the model with either RR or QLM on the Wiki weak-supervision data can significantly improve cross-lingual coarse-grained semantics alignment. This may be used to provide improvement on more applications beyond cross-lingual retrieval.

TABLE 6

Cross-lingual sentence alignment (XSA) results on a dataset. Numbers are P@1 in percentage (%).

| Language pairs | De&En | De&Es | De&Fr | En&Es | En&Fr | Es&Fr |
|---|---|---|---|---|---|---|
| Base mBERT | 1.9 | 4.3 | 6.3 | 1.6 | 2.2 | 7.4 |
| +QLM | 27.4 | 51.9 | 52.3 | 53.2 | 50.9 | 63.5 |
| +RR | 16.6 | 25.8 | 28.4 | 33.8 | 22.5 | 46.0 |
| +QLM&RR | 22.7 | 36.4 | 45.4 | 45.4 | 43.1 | 57.9 |

TABLE 7

Cross-lingual document alignment (XDA) results on a dataset. Numbers are P@1 in percentage (%).

| Language pairs | En&Es | En&Fr | Es&Fr |
|---|---|---|---|
| Base mBERT | 2.6 | 5.2 | 30.3 |
| +QLM | 24.9 | 23.3 | 61.0 |
| +RR | 19.1 | 22.5 | 65.1 |
| +QLM&RR | 40.3 | 43.1 | 81.5 | d) Effect of Window Size in GSW Attention

An assumed key parameter in the global+sliding window (GSW) attention is the window size w. In the context of cross-lingual retrieval, it represents the number of neighboring tokens a document token can "attend" to in a single Transformer layer. Although GSW is theoretically superior to full self-attention in terms of efficiency (linear versus square), a large window size might void the effort in practice. Therefore, it is important to evaluate how the setting of window size might influence the performance on desired tasks. To that end, four different window size w={32, 64, 128, 256} were chosen for experiments. For all four model embodiments, the input sequence limitation was set to 1024 tokens, they were pretrained on English-French part of the weak-supervision data (described in Section D.1) on QLM+RR pretraining modeling tasks, and CLIR evaluation was performed on the CLEF dataset (as in Section F.1) in two directions (En→Fr and Fr→En). The results are reported in TABLE 8. No statistically significant differences on downstream CLIR performance caused by different window size w in GSW attention was observed. Taking into account the randomness of model training, it may be concluded that window size w in the GSW attention has no obvious impact on the CLIR task. In practice, one may prioritize longer sequence length over larger window size when facing a trade-off.

TABLE 8

The effect of window size w in GSW attention on CLIR performance. Numbers are MAP.

| Languages (Q→D) | En→Fr | Fr→En |
|---|---|---|
| w = 32 | 0.512 | 0.509 |
| w = 64 | 0.510 | 0.506 |
| w = 128 | 0.516 | 0.512 |
| w = 256 | 0.509 | 0.503 |

G. Some Observations

It was shown herein that the absence of cross-lingual passage-level relevance data and the lack of proper query-document style pretraining are among some of the key reasons for the inferior performance in adopting multilingual language models for CUR. To overcome such difficulties, embodiments of two novel pretraining objectives were developed to improve Transformer-based cross-lingual language models for retrieval tasks. Also, embodiments of a method for creating fine-grained cross-lingual query-document style weak-supervision data were presented herein, and using this methodology, datasets were newly created from multilingual texts to support large-scale pretraining. Embodiments employ global+sliding window attention to allow the language models to encode much longer documents in all three stages (pretraining, finetuning, and inference) efficiently. Extensive experiments demonstrate the effectiveness of contributions of the embodiments on both cross-lingual ad-hoc retrieval and cross-lingual extractive question answering. Detailed ablation studies justify modeling choices and parameter selections. It was also discovered that model embodiments can significantly improve coarse-grained semantic alignment across languages, which can lead to a wider range of applications beyond retrieval.

H. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, stylus, touchscreen and/or video display. The computing system may also include one or more buses operable to transmit communications between the various hardware components.

Figure 20:
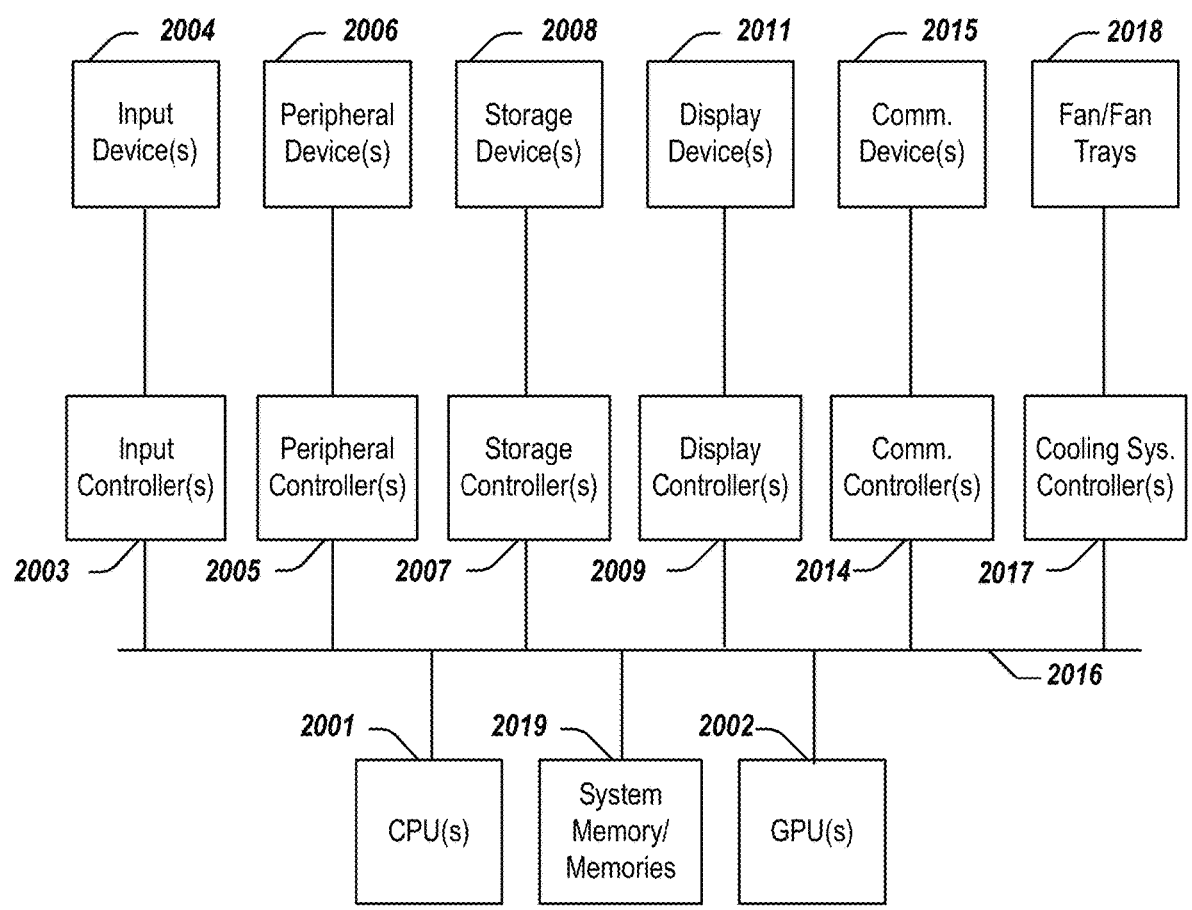
FIG. 20 depicts a simplified block diagram of a computing device/information handling system, according to embodiments of the present disclosure.

FIG. 20 depicts a simplified block diagram of an information handling system (or computing system), according to embodiments of the present disclosure. It will be understood that the functionalities shown for system 2000 may operate to support various embodiments of a computing system—although it shall be understood that a computing system may be differently configured and include different components, including having fewer or more components as depicted in FIG. 20.

As illustrated in FIG. 20, the computing system 2000 includes one or more central processing units (CPU) 2001 that provide computing resources and control the computer. CPU 2001 may be implemented with a microprocessor or the like, and may also include one or more graphics processing units (GPU) 2002 and/or a floating-point coprocessor for mathematical computations. In one or more embodiments, one or more GPUs 2002 may be incorporated within the display controller 2009, such as part of a graphics card or cards. Thy system 2000 may also include a system memory 2019, which may comprise RAM, ROM, or both.

A number of controllers and peripheral devices may also be provided, as shown in FIG. 20. An input controller 2003 represents an interface to various input device(s) 2004, such as a keyboard, mouse, touchscreen, and/or stylus. The computing system 2000 may also include a storage controller 2007 for interfacing with one or more storage devices 2008 each of which includes a storage medium such as magnetic tape or disk, or an optical medium that might be used to record programs of instructions for operating systems, utilities, and applications, which may include embodiments of programs that implement various aspects of the present disclosure. Storage device(s) 2008 may also be used to store processed data or data to be processed in accordance with the disclosure. The system 2000 may also include a display controller 2009 for providing an interface to a display device 2011, which may be a cathode ray tube (CRT) display, a thin film transistor (TFT) display, organic light-emitting diode, electroluminescent panel, plasma panel, or any other type of display. The computing system 2000 may also include one or more peripheral controllers or interfaces 2005 for one or more peripherals 2006. Examples of peripherals may include one or more printers, scanners, input devices, output devices, sensors, and the like. A communications controller 2014 may interface with one or more communication devices 2015, which enables the system 2000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2000 comprises one or more fans or fan trays 2018 and a cooling subsystem controller or controllers 2017 that monitors thermal temperature(s) of the system 2000 (or components thereof) and operates the fans/fan trays 2018 to help regulate the temperature.

In the illustrated system, all major system components may connect to a bus 2016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for pretraining a cross-lingual language model, the method comprising:
   responsive to a stop condition not being reached, performing steps comprising:
      given a relevance ranking batch of cross-lingual query and document pairs, in which the relevance ranking batch comprises (1) at least one positive sample cross-lingual query and document pair, in which the query and the document are in different languages and the document is relevant to the query and (2) at least one negative sample cross-lingual query and document pair, in which the query and the document are in different languages and the document is not relevant to the query, using the cross-lingual language model with a relevance ranking model head to predict a relevance ranking that ranks whether a document is relevant to a corresponding query;
      updating the cross-lingual language model using known relevance rankings and predicted relevance rankings;
      given a query language modeling batch of cross-lingual query and document pairs, in which the query and the document are in different languages and the document is relevant to the query, inputting the query, in which a portion of tokens in the query are masked tokens, and the corresponding document into the cross-lingual language model to predict the masked tokens of the query; and
      updating the cross-lingual language model based upon the cross-lingual language model's prediction compared to the actual masked tokens; and
   responsive to a stop condition being reached, outputting the cross-lingual language model, which has been updated, as a pretrained cross-lingual language model.

2. The computer-implemented method of claim 1 wherein the cross-lingual language model is initially obtained by performing steps comprising:
   obtaining a pretrained multilingual language representation model that comprises an attention module and that has been trained with a masked language modeling (MLM) task objective;
   replacing the attention module in the pretrained multilingual language representation model with global-plus-sliding window attention to obtain a modified language model;

updating the modified language model using an MLM task objective and a dataset to improve its performance as compared with the pretrained multilingual language representation model; and outputting the updated modified language model as the cross-lingual language model that is used for pretraining.

3. The computer-implemented method of claim 1 wherein the cross-lingual language model comprises global-plus-sliding window attention, in which a global window for attention is used for query tokens and a sliding window for attention is used for at least some document tokens.

4. The computer-implemented method of claim 1 wherein at least one of the relevance ranking batch and the query language modeling batch is obtained by performing steps comprising:

sampling from a number of different languages to train the pretrained cross-lingual language model to accept each of a number of different languages as inputs and to output each of a number of different languages as outputs.

5. The computer-implemented method of claim 1 wherein at least one of the sampling steps comprises:

matching sections of a multilingual resource or resources related to a same subject matter; and sampling a sentence or a portion thereof from a matched section in a first language as a query and using the matched section or a portion thereof in a different language as a cross-lingual document.

6. The computer-implemented method of claim 1 further comprising:

given a cross-lingual information retrieval (CLIR) model comprising the pretrained cross-lingual language model and a CLIR model head:

initializing parameters or weights of the CLIR model head with either random values, the model weights from the relevance ranking model head used in pretraining, or a combination;

performing training using positive and negative query-document pairs to update parameters or weights of the pretrained cross-lingual language model, of the CUR model head, or both; and outputting the trained CLIR model.

7. The computer-implemented method of claim 1 further comprising:

given a cross-lingual question answering (CLQA) model comprising the pretrained cross-lingual language model and a CLQA model head:

initializing parameters or weights of the CLQA model head;

performing training using training samples to update parameters or weights of the pretrained cross-lingual language model, of the CLQA model head, or both; and outputting the trained CLQA model.

8. A system comprising:
one or more processors; and
a non-transitory computer-readable medium or media comprising one or more sets of instructions which, when executed by at least one of the one or more processors, causes steps to be performed comprising:

responsive to a stop condition not being reached, performing steps comprising:

given a relevance ranking batch of cross-lingual query and document pairs, in which the relevance ranking batch comprises (1) at least one positive sample cross-lingual query and document pair, in which the query and the document are in different languages and the document is relevant to the query and (2) at least one negative sample cross-lingual query and document pair, in which the query and the document are in different languages and the document is not relevant to the query, using a cross-lingual language model with a relevance ranking model head to predict a relevance ranking that ranks whether a document is relevant to a corresponding query;

updating the cross-lingual language model using known relevance rankings and predicted relevance rankings;

given a query language modeling batch of cross-lingual query and document pairs, in which the query and the document are in different languages and the document is relevant to the query, inputting the query, in which a portion of tokens in the query are masked tokens, and the corresponding document into the cross-lingual language model to predict the masked tokens of the query; and updating the cross-lingual language model based upon the cross-lingual language model's prediction compared to the masked tokens; and responsive to a stop condition being reached, outputting the cross-lingual language model, which has been updated, as a pretrained cross-lingual language model.

9. The system of claim 8 wherein the cross-lingual language model is initially obtained by performing steps comprising:

obtaining a pretrained multilingual language representation model that comprises an attention module and that has been trained with a masked language modeling (MLM) task objective;

replacing the attention module in the pretrained multilingual language representation model with global-plus-sliding window attention to obtain a modified language model;

updating the modified language model using an MLM task objective and a dataset to improve its performance as compared with the pretrained multilingual language representation model; and outputting the updated modified language model as the cross-lingual language model that is used for pretraining.

10. The system of claim 8 wherein the cross-lingual language model comprises global-plus-sliding window attention in which a global window for attention is used for query tokens and a sliding window for attention is used for at least some document tokens.

11. The system of claim 8 wherein at least one of the relevance ranking batch and the query language modeling batch is obtained by performing steps comprising:

sampling from a number of different languages to train the pretrained cross-lingual language model to accept each of a number of different languages as inputs and to output each of a number of different languages as outputs.

12. The system of claim 8 wherein at least one of the sampling steps comprises:

matching sections of a multilingual resource or resources related to a same subject matter; and sampling a sentence or a portion thereof from a matched section in a first language as a query and using the matched section or a portion thereof in a different language as a cross-lingual document.

13. The system of claim 8 wherein the non-transitory computer-readable medium or media further comprises one or more sequences of instructions which, when executed by at least one of the one or more processors, causes steps to be performed comprising:
given a cross-lingual information retrieval (CLIR) model comprising the pretrained cross-lingual language model and a CLIR model head:
initializing parameters or weights of the CLIR model head with either random values, the model weights from the relevance ranking model head used in pretraining, or a combination;
performing training using positive and negative query-document pairs to update parameters or weights of the pretrained cross-lingual language model, of the CUR model head, or both; and
outputting the trained CLIR model.

14. The system of claim 8 wherein the non-transitory computer-readable medium or media further comprises one or more sequences of instructions which, when executed by at least one of the one or more processors, causes steps to be performed comprising:
given a cross-lingual question answering (CLQA) model comprising the pretrained cross-lingual language model and a CLQA model head:
initializing parameters or weights of the CLQA model head;
performing training using training samples to update parameters or weights of the pretrained cross-lingual language model, of the CLQA model head, or both; and
outputting the trained CLQA model.

15. A computer-implemented method for pretraining a cross-lingual language model, the method comprising:
using a pretrained multilingual language representation model to initialize a cross-lingual language model that uses global-plus-sliding window attention, in which a global window for attention is used for query tokens and a sliding window for attention is used for at least some document tokens;
responsive to a stop condition not being reached, performing steps comprising:
given cross-lingual query and document pairs in which at least some of query tokens of a query input into the cross-lingual language model are masked, training the cross-lingual language model using a query language model objective regarding predicting, for a query, the masked query tokens given a corresponding relevant cross-lingual document; and
given cross-lingual query and document pairs, training the cross-lingual language model with a relevance ranking model head to predict a relevance ranking that ranks whether a document is relevant to a corresponding query; and
responsive to a stop condition being reached, outputting the cross-lingual language model, which has been updated, as a pretrained cross-lingual language model.

16. The computer-implemented method of claim 15 wherein the step of using a pretrained multilingual language representation model to initialize a cross-lingual language model that uses global-plus-sliding window attention comprises:
obtaining a pretrained multilingual language representation model that comprises an attention module and that has been trained with a masked language modeling (MLM) task objective;
replacing the attention module in the pretrained multilingual language representation model with global-plus-sliding window attention to obtain a modified language model;
updating the modified language model using an MLM task objective and a dataset to improve its performance as compared with the pretrained multilingual language representation model; and
outputting the updated modified language model as the cross-lingual language model that is used for pretraining.

17. The computer-implemented method of claim 15 further comprising:
obtaining cross-lingual query and document pairs for training the cross-lingual language model with the relevance ranking model head by performing steps comprising:
sampling a set of cross-lingual query and document pairs, in which the set comprises:
at least one positive sample cross-lingual query and document pair, in which the query and the document are in different languages and the document is relevant to the query; and
at least one negative sample cross-lingual query and document pair, in which the query and the document are in different languages and the document is not relevant to the query; and
obtaining cross-lingual query and document pairs for training the cross-lingual language model with the query language model objective by performing steps comprising:
sampling a set of cross-lingual query and document pairs, in which the query and the document are in different languages and the document is relevant to the query.

18. The computer-implemented method of claim 15 wherein at least one of the sampling steps comprises:
sampling from a number of different languages to train the pretrained cross-lingual language model to accept each of a number of different languages as inputs and to output each of a number of different languages as outputs.

19. The computer-implemented method of claim 15 further comprising:
given a cross-lingual information retrieval (CLIR) model comprising the pretrained cross-lingual language model and a CLIR model head:
initializing parameters or weights of the CLIR model head with either random values, the model weights from the relevance ranking model head used in pretraining, or a combination;
performing training using positive and negative query-document pairs to update parameters or weights of the pretrained cross-lingual language model, of the CUR model head, or both; and
outputting the trained CLIR model.

20. The computer-implemented method of claim 15 further comprising:
given a cross-lingual question answering (CLQA) model comprising the pretrained cross-lingual language model and a CLQA model head:
initializing parameters or weights of the CLQA model head;

performing training using training samples to update parameters or weights of the pretrained cross-lingual language model, of the CLQA model head, or both; and outputting the trained CLQA model.

* * * * *